(12) United States Patent
Mai et al.

(10) Patent No.: US 9,049,193 B2
(45) Date of Patent: Jun. 2, 2015

(54) METHOD AND SYSTEM FOR DISTRIBUTING RESOURCE-AVAILABILITY INFORMATION WITHIN A DISTRUBITED COMPUTER SYSTEM

(71) Applicant: VMware, Inc., Palo Alto, CA (US)

(72) Inventors: Henry Mai, Palo Alto, CA (US); Ashish K. Hanwadikar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 294 days.

(21) Appl. No.: 13/785,706

(22) Filed: Mar. 5, 2013

(65) Prior Publication Data

US 2014/0258483 A1     Sep. 11, 2014

(51) Int. Cl.
  *G06F 15/173*    (2006.01)
  *H04L 29/08*     (2006.01)

(52) U.S. Cl.
  CPC ..................................... *H04L 67/10* (2013.01)

(58) Field of Classification Search
  CPC .............. G06F 9/45533; G06F 9/5077; G06F 9/45558; G06F 9/455; G06F 2009/4557; G06F 9/5088; G06F 2009/45562; G06F 2009/45575; H04L 43/0876; H04L 67/10
  See application file for complete search history.

(56) References Cited

U.S. PATENT DOCUMENTS

| | | | | |
|---|---|---|---|---|
| 6,600,722 B1 * | 7/2003 | Tran et al. | ...................... | 370/238 |
| 7,295,514 B2 * | 11/2007 | Cha et al. | ...................... | 370/230 |
| 7,412,492 B1 * | 8/2008 | Waldspurger | .................. | 709/216 |
| 7,941,521 B1 * | 5/2011 | Petrov et al. | ................... | 709/224 |
| 8,443,083 B2 * | 5/2013 | Khushu et al. | ................ | 709/226 |
| 2004/0205206 A1 * | 10/2004 | Naik et al. | ..................... | 709/230 |
| 2008/0049755 A1 * | 2/2008 | Gannon et al. | ............. | 370/395.1 |

* cited by examiner

*Primary Examiner* — Peling Shaw

(57) ABSTRACT

Methods and systems disclosed in the current application are directed to efficient distribution of resource-availability information with respect to individual computer systems within a distributed computer system in order to facilitate various types of computational tasks, including configuration and management tasks and facilities. Certain of these implementations are based on highly efficient, lockless, message-based information-distribution methods and subsystems that transmission of messages at a frequency computed from a computed level of resource availability.

21 Claims, 30 Drawing Sheets

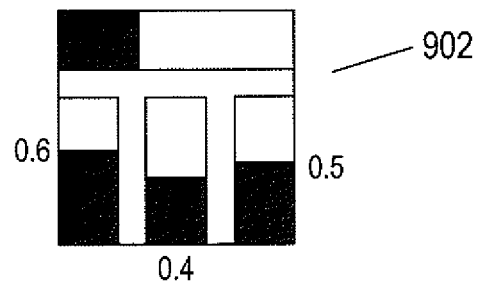

$$S = 0.6$$
$$P = 0.4 \Bigg\} \; 904$$
$$C = 0.5$$

906 — $RA = \dfrac{(1-S)+(1-P)+(1-C)}{3}, \quad RA \in [0,1]$

908 $\begin{cases} P_S = \begin{cases} 0, \text{when } S > S\_threshold \\ -0.5, otherwise \end{cases} \\ P_P = \begin{cases} 0, \text{when } P > P\_threshold \\ -0.5, otherwise \end{cases} \\ P_C = \begin{cases} 0, \text{when } C > C\_threshold \\ -0.5, otherwise \end{cases} \end{cases}$

910 — $RM = RA + P_S + P_P + P_C$

912 — $f_{RA} = \begin{cases} RM, \text{when } RM > min, \\ min, \; otherwise \end{cases} \quad f_{RA} \in [min,1]$ 914 $\begin{cases} V_{Balance} = k \cdot f_{RA}, & V_{Balance} \in [k \cdot min, k] \\ V_{Power} = \dfrac{l \cdot min}{f_{RA}}, & V_{Power} \in [l \cdot min, l] \end{cases}$

FIG. 9

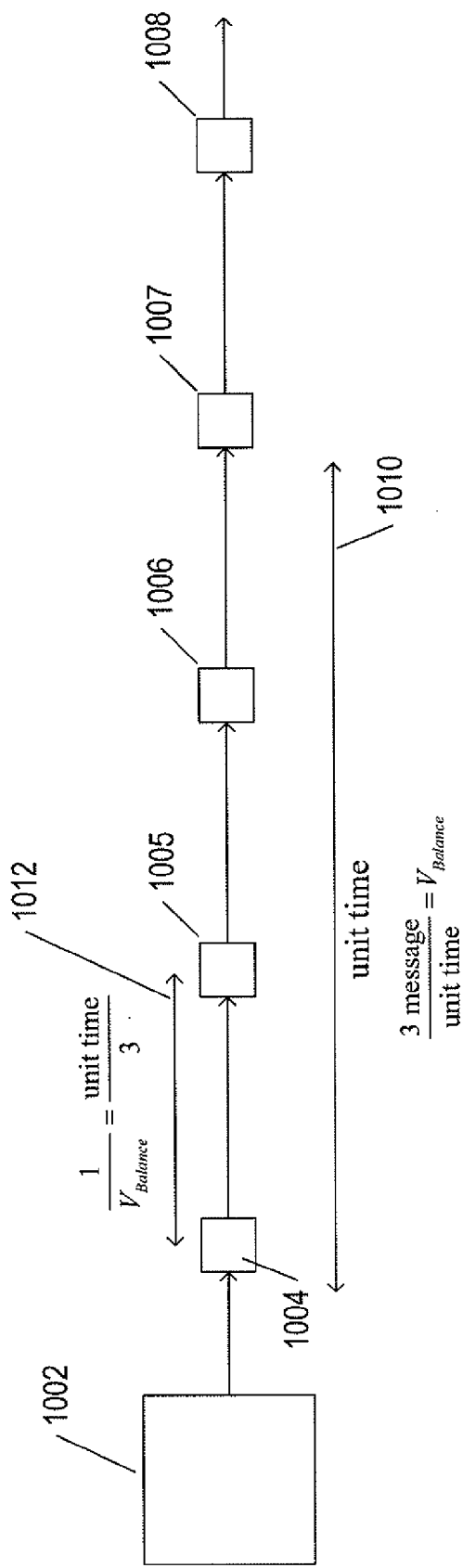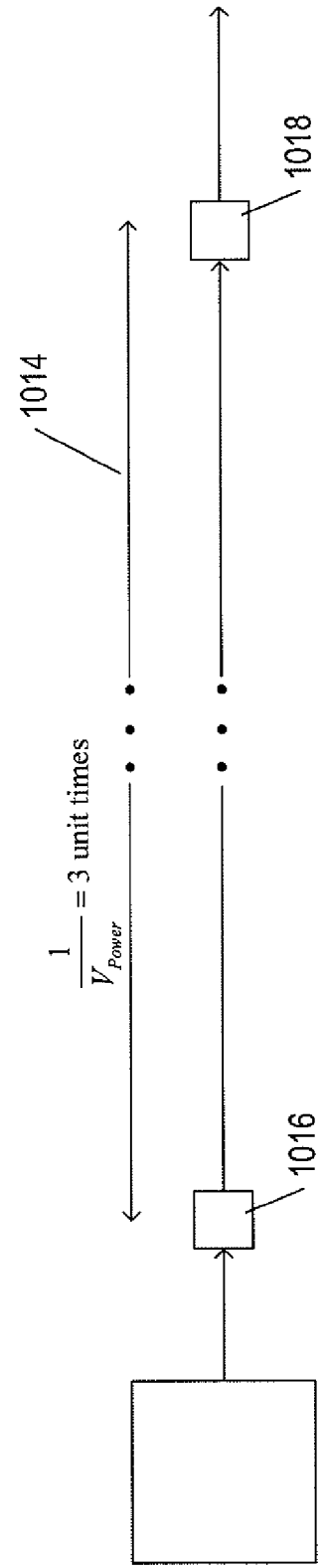
FIG. 10A
FIG. 10B

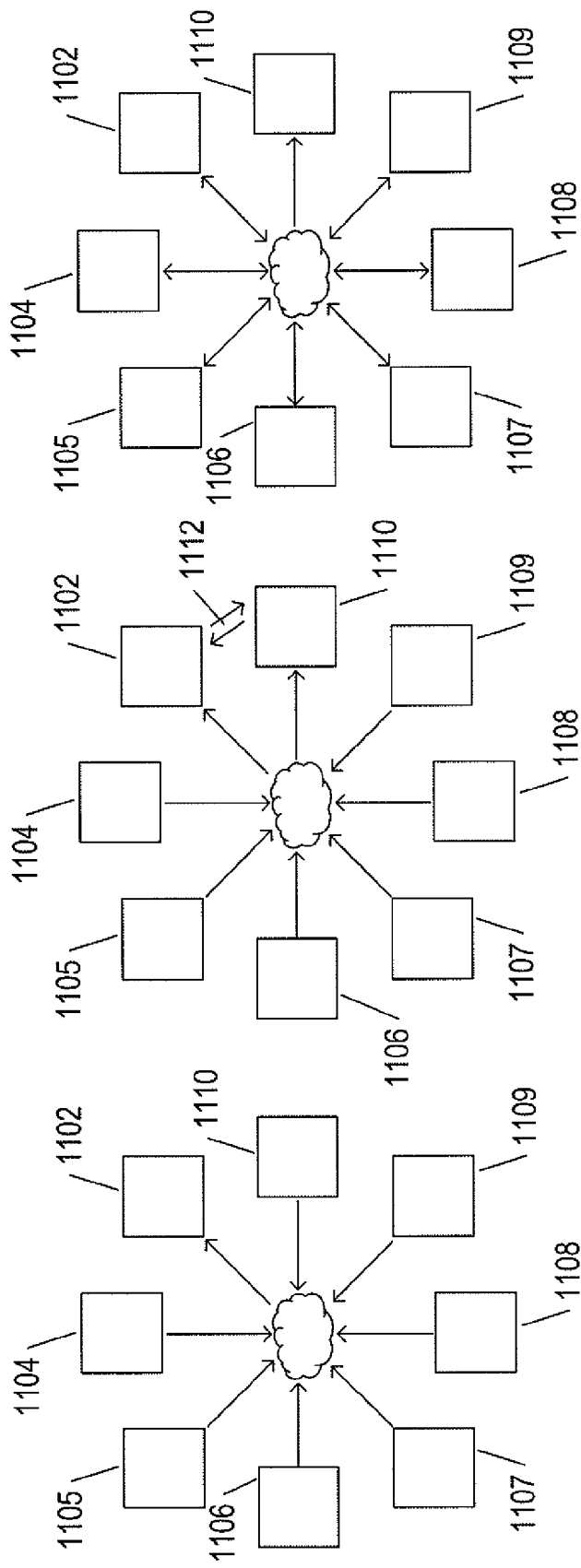

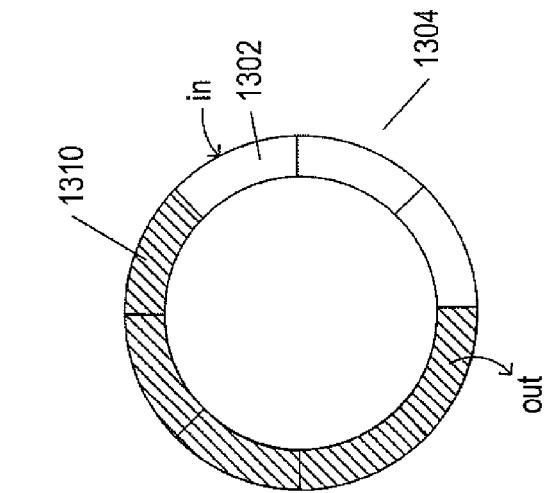
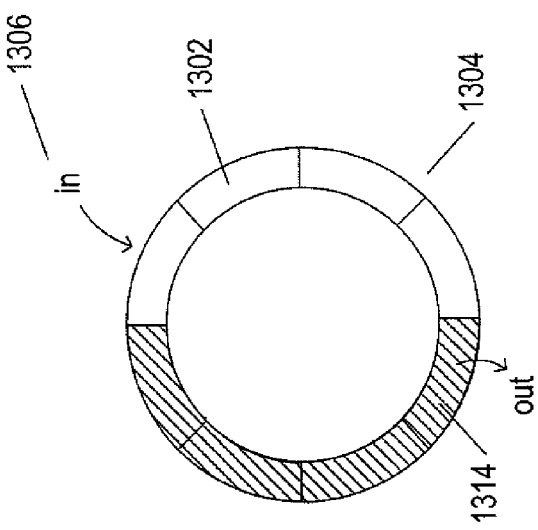
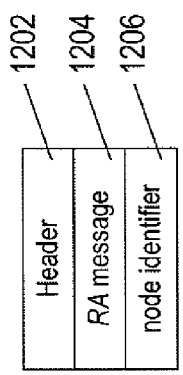
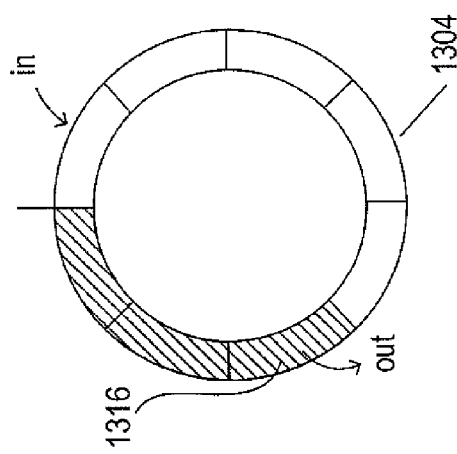

$V = \alpha V_{Balance} + (1-\alpha) V_{Power}$

METHOD AND SYSTEM FOR DISTRIBUTING RESOURCE-AVAILABILITY INFORMATION WITHIN A DISTRUBITED COMPUTER SYSTEM

TECHNICAL FIELD

The current application is directed to configuration and management of computer systems that include multiple, discrete computer systems interconnected by electronic communications and, in particular, to methods and systems for distributing resource-availability information within the distributed computer system to facilitate various computational tasks, including configuration and management tasks.

BACKGROUND

During the past 60 years, computers have evolved from huge, single-processor machines that were capable of executing only a single program at a time and that lacked what is today considered to be basic operating-system functionalities to currently available distributed computer systems that may include large numbers of individual, discrete computer systems, each with multiple processors and terabytes or petabytes of electronic data-storage capacity and which are interconnected by high-bandwidth electronic communications media and communications subsystems. Basic operational parameters of computer systems, including data-storage capacity, processor bandwidth or available processor cycles per unit time, and data-transfer bandwidths through communications media and subsystems, continue to increase geometrically. Operating-system technologies have evolved in parallel with the rapid evolution of hardware technologies, and include sophisticated distributed-computing operating systems and distributed virtual-machine-monitor-based control systems that allow virtual machines and other computing tasks to be distributed, managed, and moved, while executing, among the discrete computer systems within very large distributed computer systems.

Distributed-computing technologies, while having evolved to provide greatly increased functionality and efficiency, are nonetheless constrained by fundamental distributed-computing constraints and inefficiencies, including constraints and inefficiencies associated with providing concurrent access by multiple processes running in multiple, discrete computer systems to commonly shared computing resources, including stored data in various types of shared data-storage devices. Many different technologies have been developed and refined to address many of these constraints, including various types of distributed locking protocols to serialize access to shared resources despite the lack of a reliable, common system clock within distributed systems. However, as with any computational system, the removal or satisfaction of such constraints is generally obtained at the cost of computational overhead. This computational overhead may accumulate during execution of higher-level functionalities, including configuration and management functionalities within a distributed computer system. Designers, developers, and users of distributed computer systems continue to seek more efficient approaches to underlying distributed-computing problems in order to increase the efficiency of distributed-computing configuration and management facilities.

SUMMARY

Methods and systems disclosed in the current application are directed to efficient distribution of resource-availability information with respect to individual computer systems within a distributed computer system in order to facilitate various types of computational tasks, including configuration and management tasks and facilities. Certain of these implementations are based on highly efficient, lockless, message-based information-distribution methods and subsystems that transmission of messages at a frequency computed from a computed level of resource availability.

BRIEF DESCRIPTION OF THE DRAWINGS

FIG. 9 illustrates one approach to computing two different message frequencies, $V_{Balance}$ and $V_{Power}$, used, in certain implementations, for load balancing and power management, respectively.

FIGS. 10A-B illustrate use of the computed frequencies $V_{Balance}$ and $V_{Power}$ by a node of a distributed computer system.

FIGS. 11A-C illustrate various types of management that may be carried out within a distributed computer system using methods and systems to which the current application is directed.

FIG. 12 shows an example resource-availability message.

FIGS. 13A-C illustrate a circular queue that is conveniently used to buffer received messages at many different levels within computer systems.

DETAILED DESCRIPTION

The current application is directed to methods and systems for distributing resource-availability information with respect to individual computer systems among the computer systems of a distributed computer system. The resource-availability information can be used for many different types of computational tasks, including configuration and management tasks. Currently available methods and systems for distributing resource-availability information involve distributed locking protocols and significant calculation with significant attendant computational overheads. The methods and systems disclosed in the current application do not employ distributed-locking protocols and complex calculations and are instead computationally straightforward and efficient. In order to describe the methods and systems to which the current application is directed, the detailed-description section of the current application includes three subsections: (1) a brief overview of computer architecture and virtual machines; (2) a review of load balancing and power management within distributed computer systems; and (3) a discussion of the methods and systems to which the current application is directed.

A Brief Overview of Computer Architecture and Virtual Machines

Figure 1:
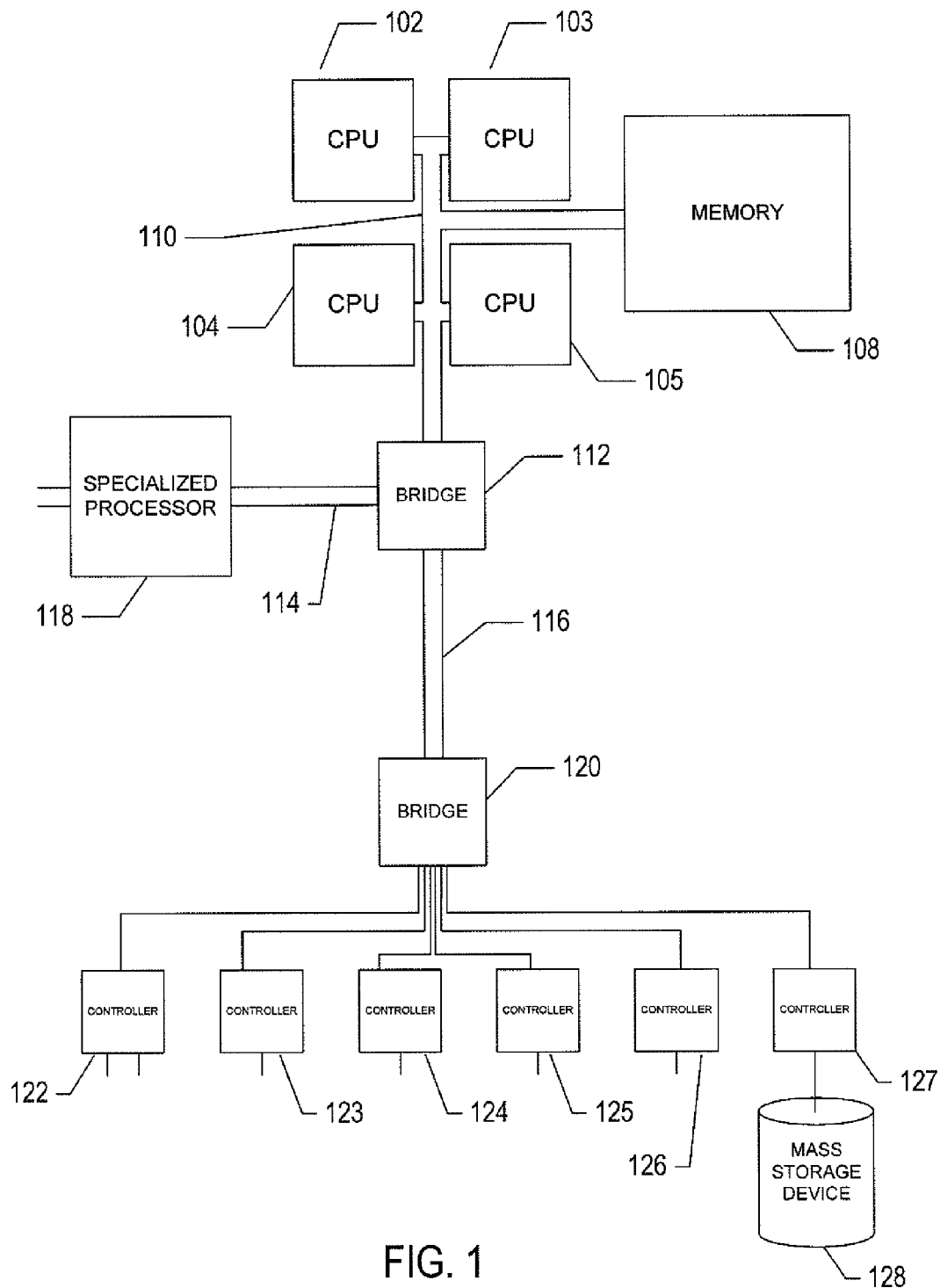
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
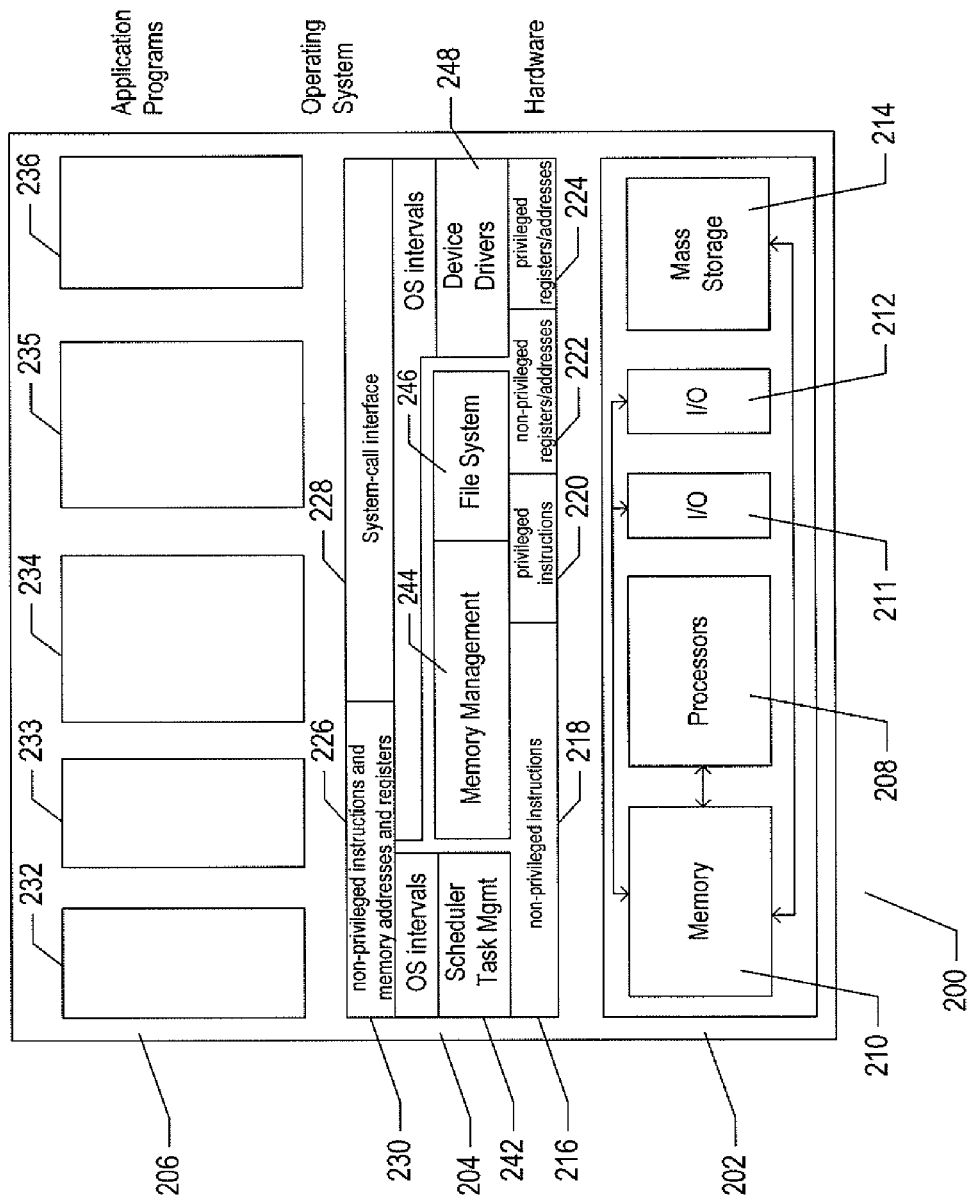
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged processor instructions 218, a set of privileged processor instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 236 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3:
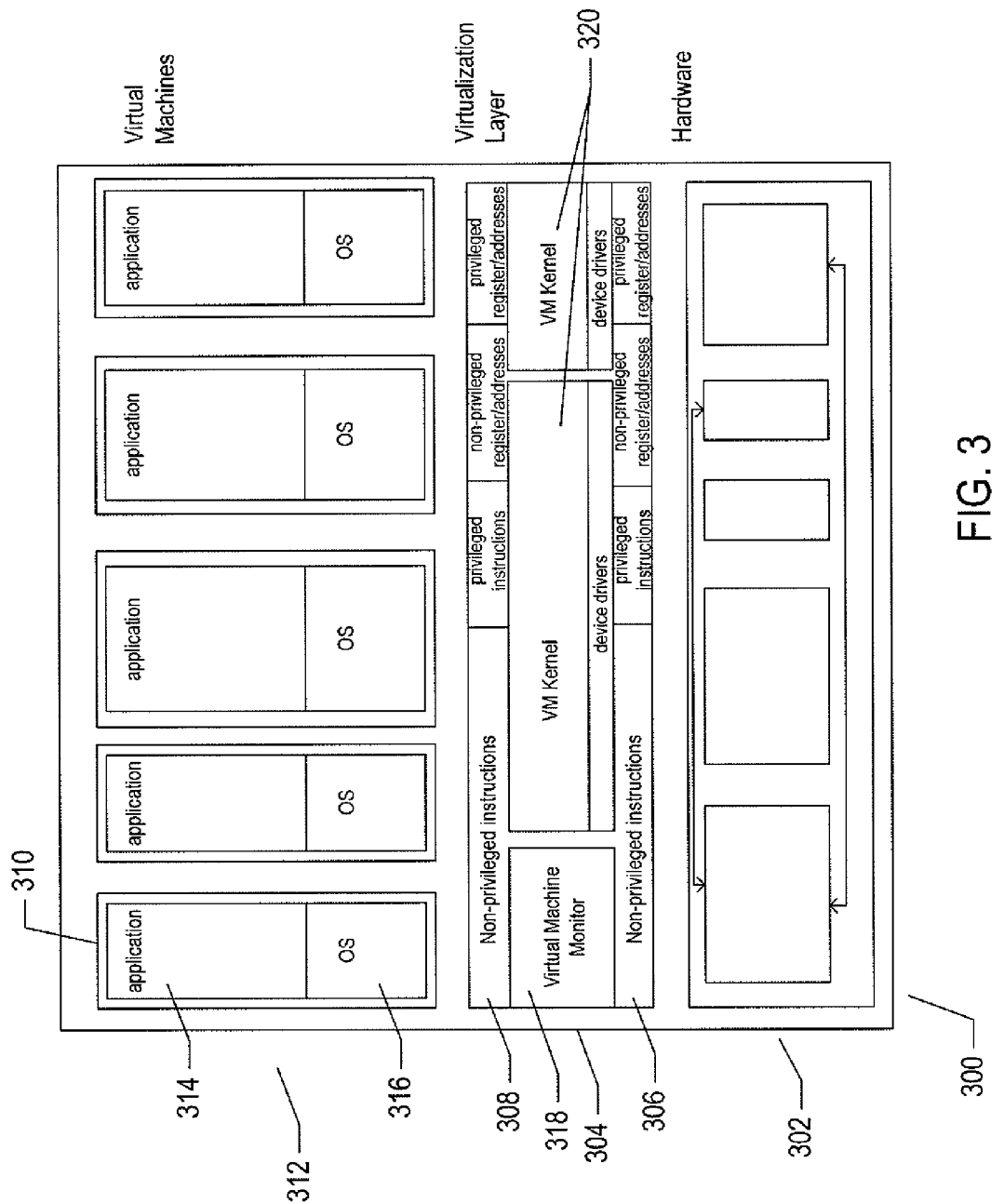
FIG. 3 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 3 illustrates one type of virtual machine and virtual-machine execution environment. FIG. 3 uses the same illustration conventions as used in FIG. 2. In particular, the computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 312. Each virtual machine includes one or more application programs or other higher-level computational entities packaged together with an operating system, such as application 314 and operating system 316 packaged together within virtual machine 310. Each virtual machine is thus equivalent to the operating-system layer 204 and application-program layer 206 in the general-purpose computer system shown in FIG. 2. Each operating system within a virtual machine interfaces to the virtualization-layer interface 308 rather than to the actual hardware interface 306. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor module 318 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 4:
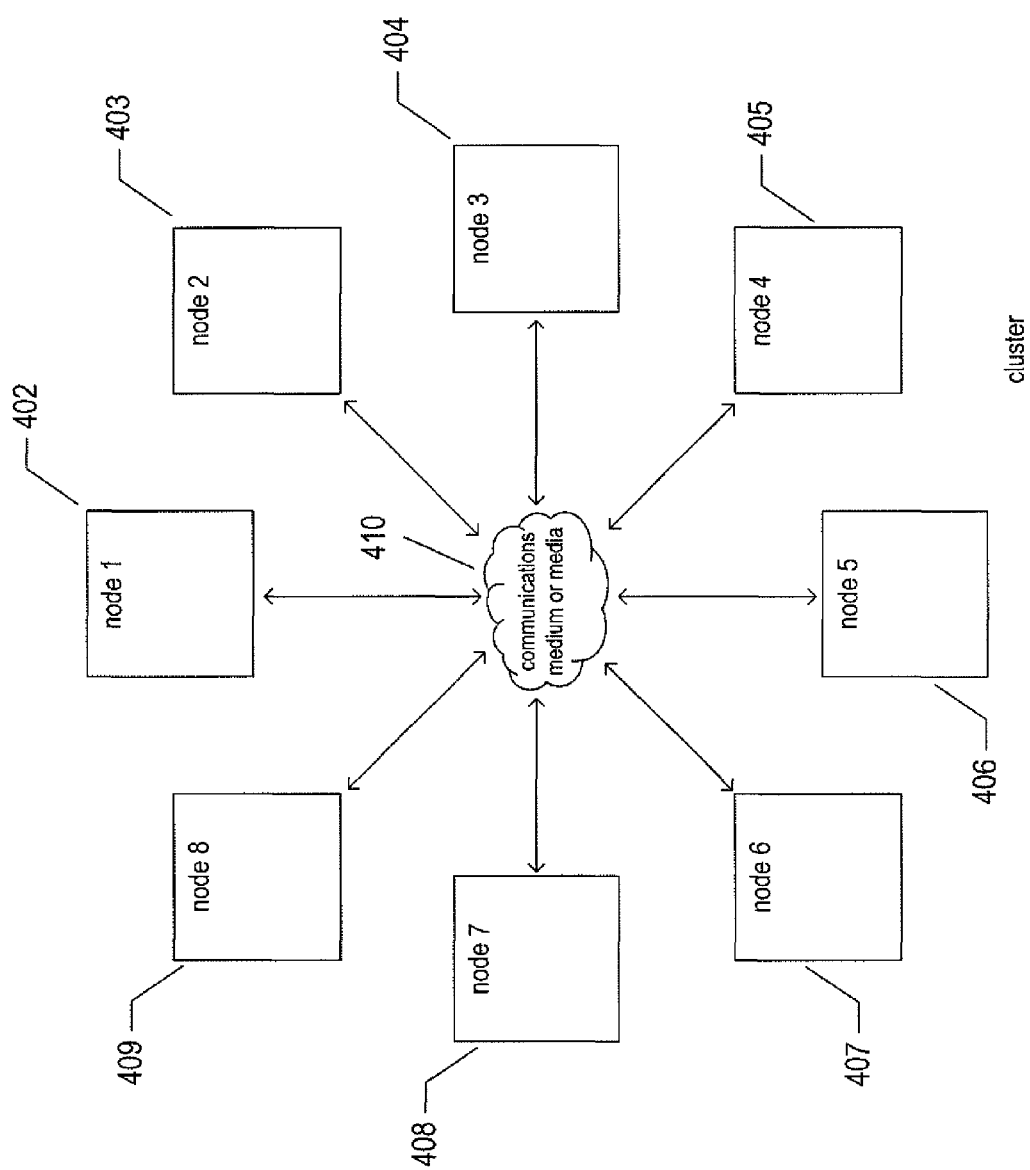
FIG. 4 shows a small, example distributed computer system that is used, in the following discussion, as context for describing methods and systems to which the current application is directed.

A Review of Load Balancing and Power Management within Distributed Computer Systems FIG. 4 shows a small, example distributed computer system that is used, in the following discussion, as context for describing methods and systems to which the current application is directed. The distributed computer system shown in FIG. 4 includes eight discrete computer-system nodes 402-409. These nodes may be workstations, personal computers, various types of server computers, or may themselves be distributed computer systems, and each may include any of many different types of electronic data-storage subsystems, may include multiple processors, and may execute any of many different types of operating systems, virtual-machine monitors, and other types of control programs that provide execution environments for processes and virtual machines. The nodes intercommunicate through one or more different types of communications media 410. The nodes may be interconnected by local area networks, storage-area networks, point-to-point interconnects, wide area networks, and various types of hybrid communications, including the Internet. The physical topology and details of the communications media and networking are not relevant to the current discussion. Relevant to the current discussion is the fact that each node can transmit a message, either directly or indirectly, to each of the remaining nodes of the distributed computer system. In many cases, a message may be transmitted by one node, using a broadcast mode, to all or a subgroup of the remaining nodes, and in other cases, messages are transmitted to individual nodes of the remaining nodes. But, whatever the communications medium and technology involved, a node may transmit a message to another node of the distributed computer system. Many types of distributed computer systems are currently available, including clusters and grids.

Figure 5A:
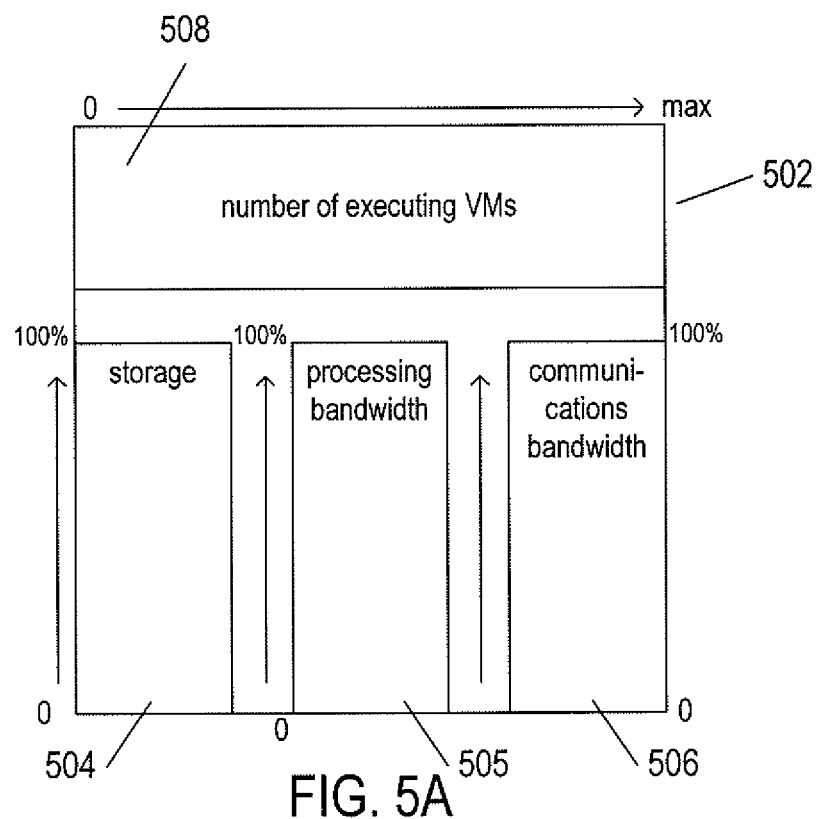
FIGS. 5A-B illustrate an illustration convention used in subsequent figures.
Figure 5B:
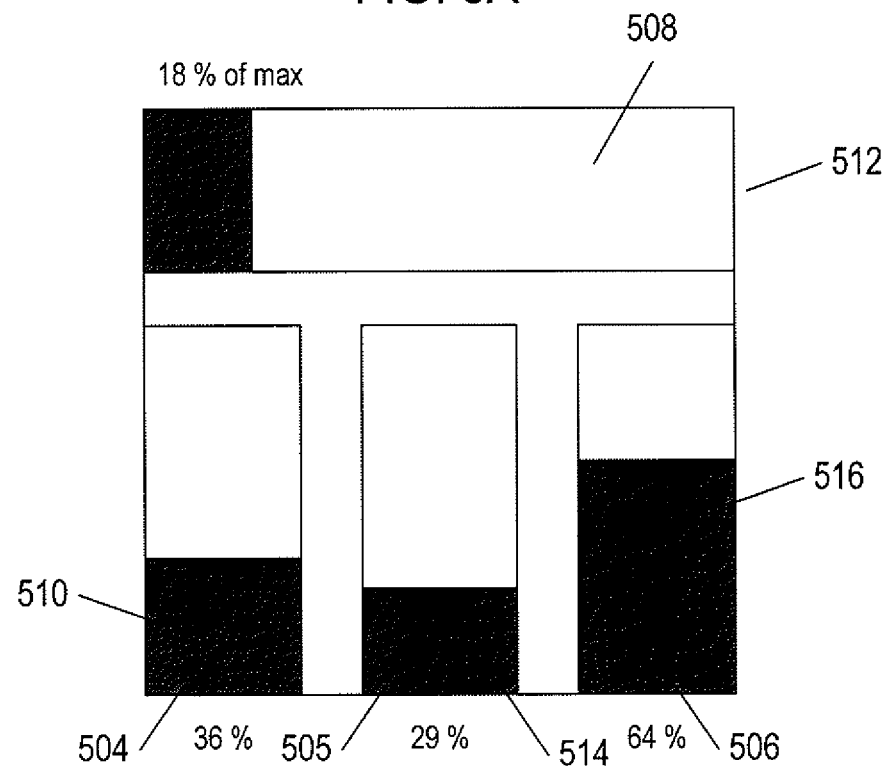

FIGS. 5A-B illustrate an illustration convention used in subsequent figures. As shown in FIG. 5A, each node in the distributed computer system is represented by a rectangular shape 502 with three vertical bars 504-506 representing the amount of storage capacity, processing capacity, and communications capacity, respectively, currently used within the node and a horizontal bar 508 representing the number of virtual machines currently executing within the node. As shown in FIG. 5A, the full height of each vertical bar represents 100 percent use of a computational capacity. In subsequent figures, as shown in FIG. 5B, the percentage of storage, processing, and communications capacities currently used within a node are indicated by the shaded portions within the vertical and horizontal bars. In FIG. 5B, the shaded portion 510 of vertical bar 504 indicates that 36 percent of the storage capacity is currently used in the node represented by rectangle 512. Shaded portion 514 of vertical bar 505 similarly indicates that 29 percent of the processing capacity of the node is currently being used and shaded portion 516 of the vertical bar 506 indicates that 64 percent of the communications capacity of the node is being used. Shaded portion 518 of horizontal bar 508 indicates that 18 percent of some maximum number of virtual machines that may execute on a node are currently executing in the node represented by the rectangular depiction 512.

It should be noted that there are many different possible metrics associated with resources and resource usage within nodes of a distributed computer system. The general storage, processing, and communications capacities and number of executing VMs used in these examples are employed entirely for illustration purposes. The methods and systems to which the current application is directed may employ any of many different metrics and computed values to represent the amount of resources currently used within a node of a distributed computer system and/or the amount of available resources within the system.

Figure 6A:
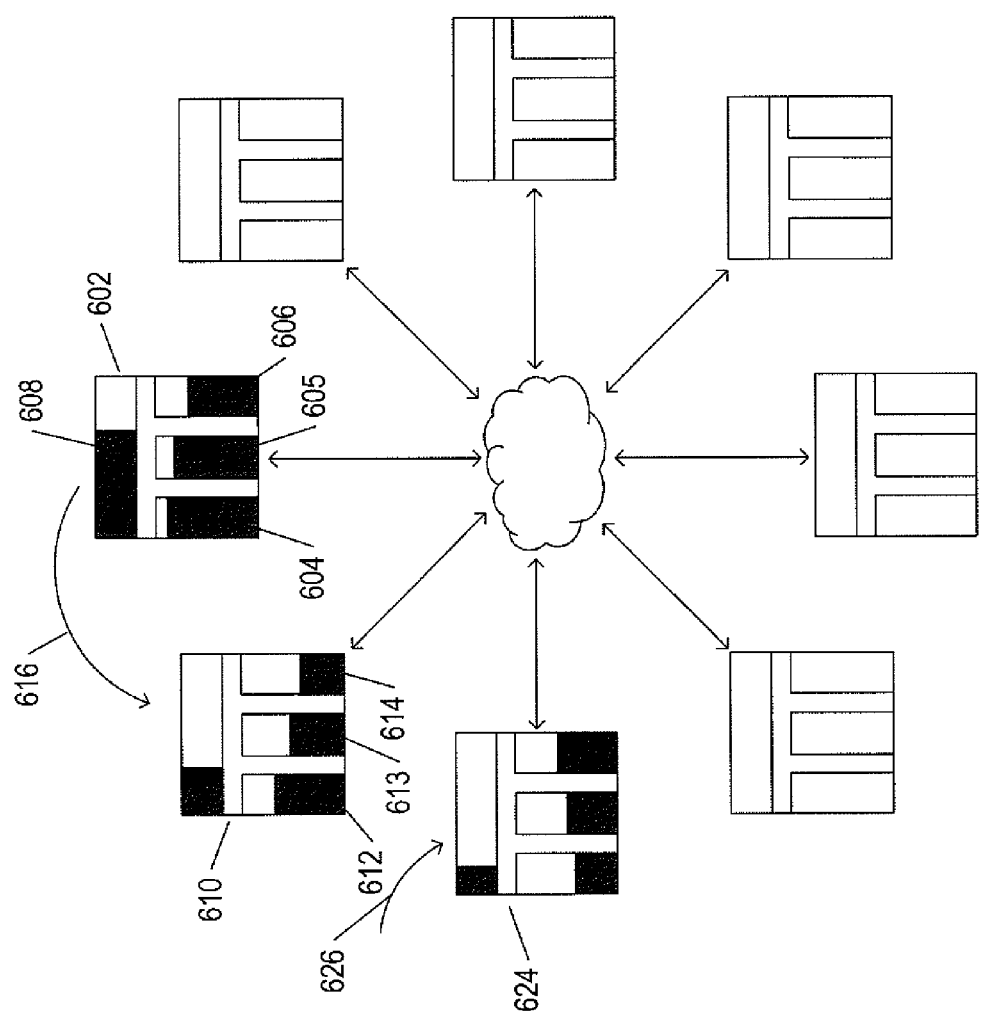
FIGS. 6A-B illustrate two different types of operations within a distributed computer system that may affect resource availability within particular nodes of the distributed computer system.
Figure 6B:
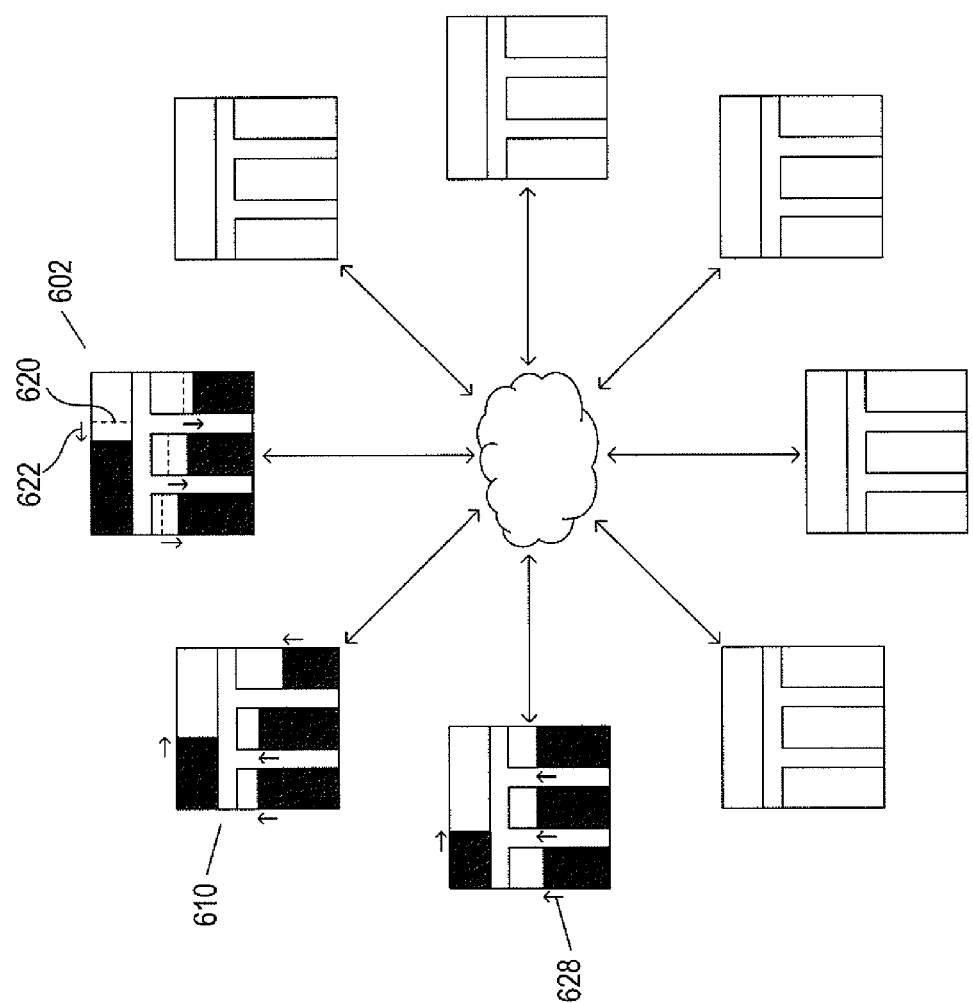

FIGS. 6A-B illustrate two different types of operations within a distributed computer system that may affect resource availability within particular nodes of the distributed computer system. These types of actions are examples and do not represent, by any means, all of the various types of actions that may occur within a distributed computer system with the result of altering resource availability within individual nodes, or discrete computers or computer systems, within the multi-node distributed computer system. In FIG. 6A, a first node 602 is operating under a relatively high load, apparent from the fact that greater than 50% of the storage, processing, and communications capacities are currently in use, as indicated by the shaded portions of vertical bars 604-606. The first node is also running a significant number of virtual machines, as indicated by the shaded portion of horizontal bar 608. A second node 610 is operating under a significantly lighter load, as evidenced by the relatively smaller shaded portions of vertical bars 612-614. A virtual machine can be moved, as indicated by curved arrow 616, from the heavily loaded node 602 to the less-heavily loaded node 610. The results of this movement, or migration, of a virtual machine executing on the first node 602 to the second node 610 is shown in FIG. 6B. As indicated by dashed line segments, such as dashed line segment 620, and by small arrows, such as arrow 622, the percentage use of the various computational resources of the first node 602 are reduced while the percentage the computational resources on the second node 610 that are currently in use have increased due to the transfer of one or more virtual machines from the first node 602 to the second node 610. Virtual machines may be transferred from one node to another even during execution. In many implementations of virtual-machine migration, the virtual machine, executing on a first node, is quiesced, the state of the virtual machine is recorded as data in a file, the file is transferred from the first node to a second node, and the process is reversed on the second node in order to launch and configure the virtual machine on the second node, where it resumes execution at the point at which it was previously quiesced.

FIGS. 6A-B also illustrate a second operation that may affect the percentage of available resources used within a node of a distributed computer system. In FIG. 6A, a third node 624, is currently modestly loaded with execution tasks. As indicated by arrow 626, a new virtual machine can be configured and launched on this node, the effects of which are indicated by arrows, such as arrow 628, in FIG. 6B. The launching of a new virtual machine within a node of the distributed computer system generally consumes resources and lowers the availability of resources on that node.

In the following discussion, the node to which a virtual machine is moved, or migrated, or on which a new virtual machine is configured and launched, is referred to as a "target node." In many distributed computer systems, target nodes are selected in the course of various types of configuration and management activities, including distribution of virtual machines, for launching and execution, to nodes within a distributed computer system and migration of nodes within a distributed computer system in order to balance the computational loads across the nodes of a distributed computer system. Another management operation in which target nodes are identified may involve shifting the computational burdens among the nodes of a distributed computer system in order to remove all computing tasks from a subset of the nodes and power down those nodes in order to conserve expenditure of electrical energy used to run the distributed computer system. It should be noted that load balancing and power management represent but two of many different types of configuration and management tasks that may involve selecting target nodes. In addition, target nodes may be selected not only for migration of virtual machines and launching of virtual machines, but for directing other types of computational tasks to one or nodes of a distributed computer system.

Figure 7A:
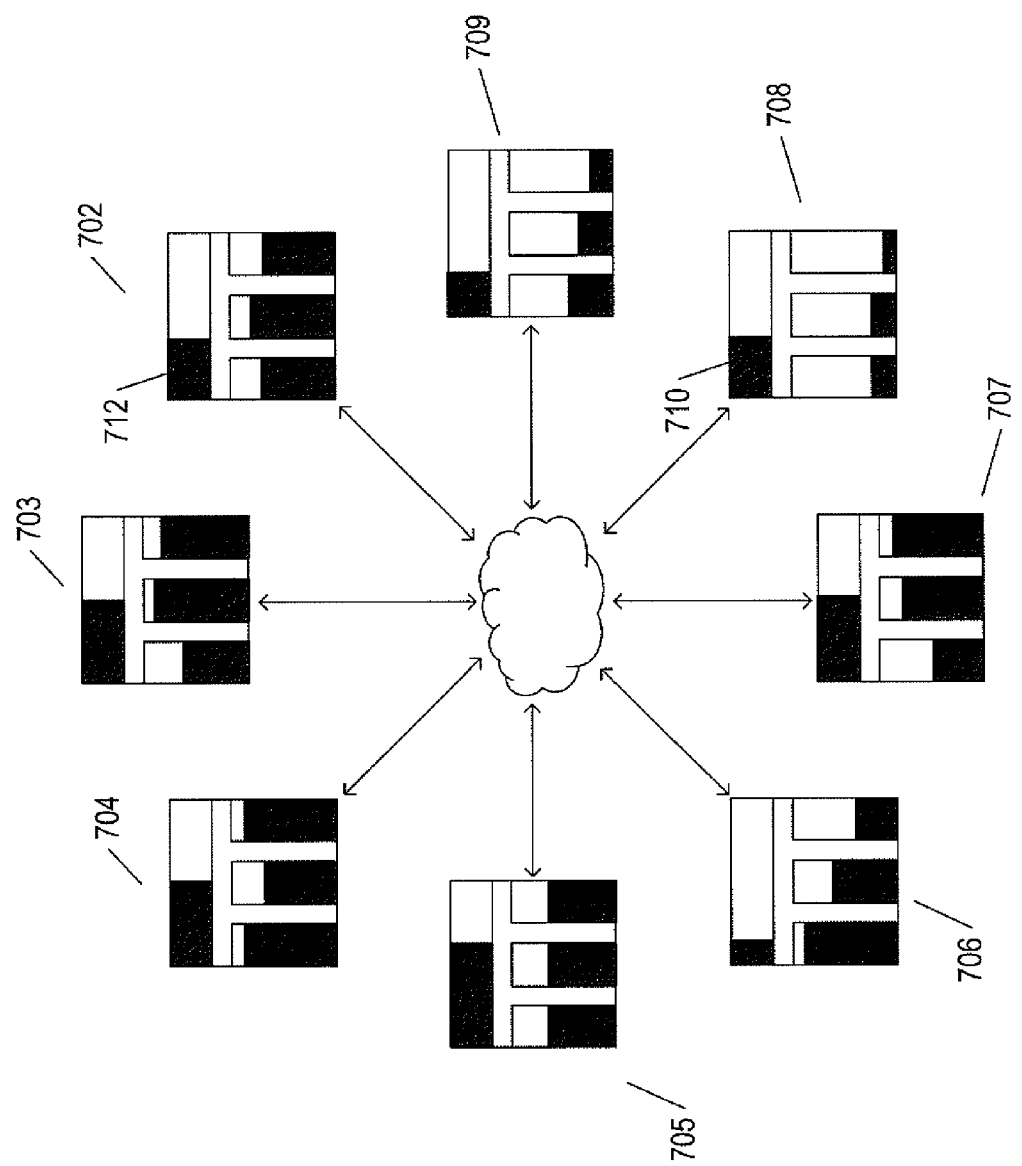
FIGS. 7A-B illustrate, using the example distributed computer system discussed above with reference to FIGS. 4-5B, a load-balancing operation.
Figure 7B:
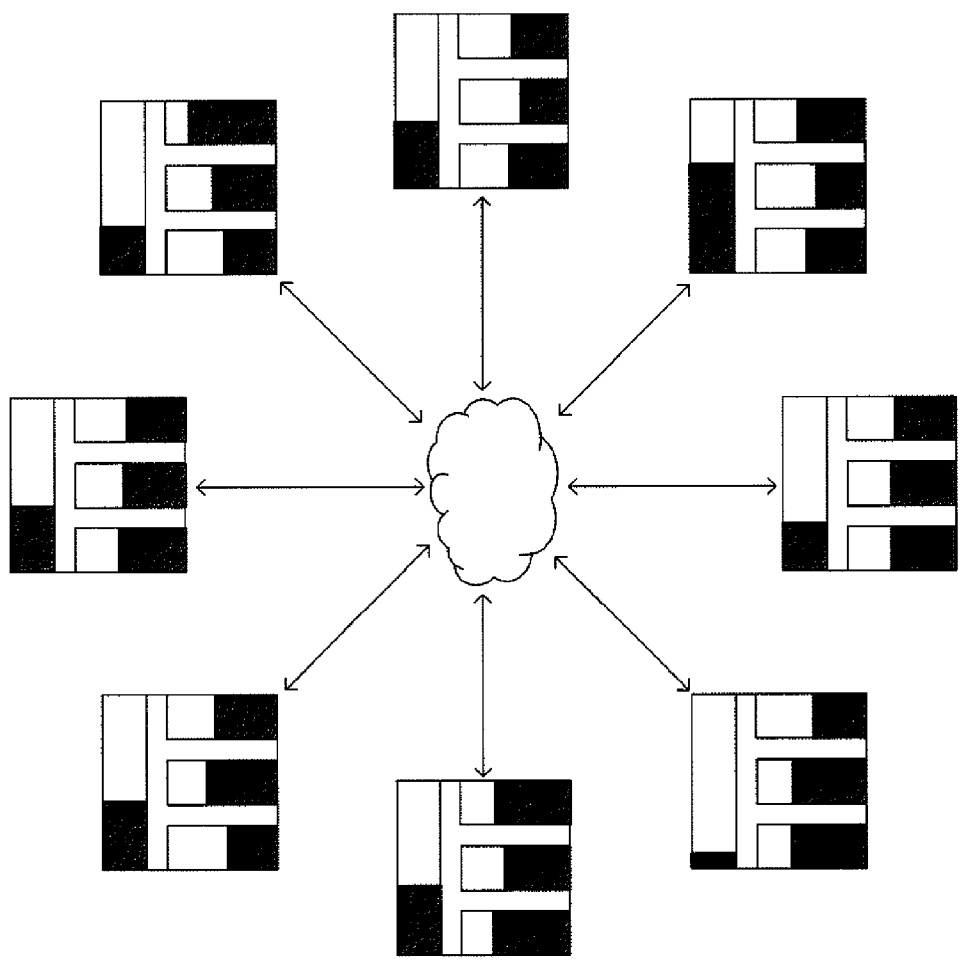

FIGS. 7A-B illustrate, using the example distributed computer system discussed above with reference to FIGS. 4-5B, a load-balancing operation. In FIG. 7A, certain of the nodes of the distributed computer system, including nodes 702-707, are relatively heavily loaded with computational tasks, as indicated by the relatively large portions of the resource capacities currently being used in these nodes. By contrast, nodes 708 and 709 are lightly loaded, with significant available resources. Note that the number of currently executing virtual machines, indicated by the horizontal bars within the nodes, is not necessarily strongly correlated with the percentage of the resources used within a node. For example, there are a fair number of virtual machines 710 executing within lightly loaded node 708 and a similar number of virtual machines 712 executing within heavily loaded node 702. While each executing virtual machine occupies some amount of memory and mass storage, the total amount of computational resources allocated to a particular executing virtual machine is highly dependent on the computational tasks currently being carried out by the virtual machine. As one example, in a disk-bound virtual-machine, the virtual machine may use only a tiny fraction of the available processing bandwidth, since the virtual machine may spend most of its time waiting for the completion of disk reads and writes. The number of virtual machines currently executing on a node of the distributed computer system is not, by itself, generally strongly reflective of the amount of available resources within the node.

FIG. 7B shows the example distributed computer system with all nodes modestly loaded with computational tasks. A load-balancing operation is a distributed-computing-system management operation that moves virtual machines between nodes of a distributed computer system in order to produce a balanced use of resources across all the nodes, as shown in FIG. 7B, rather than an unbalanced distribution of resource usage, as shown in FIG. 7A.

Figure 8A:
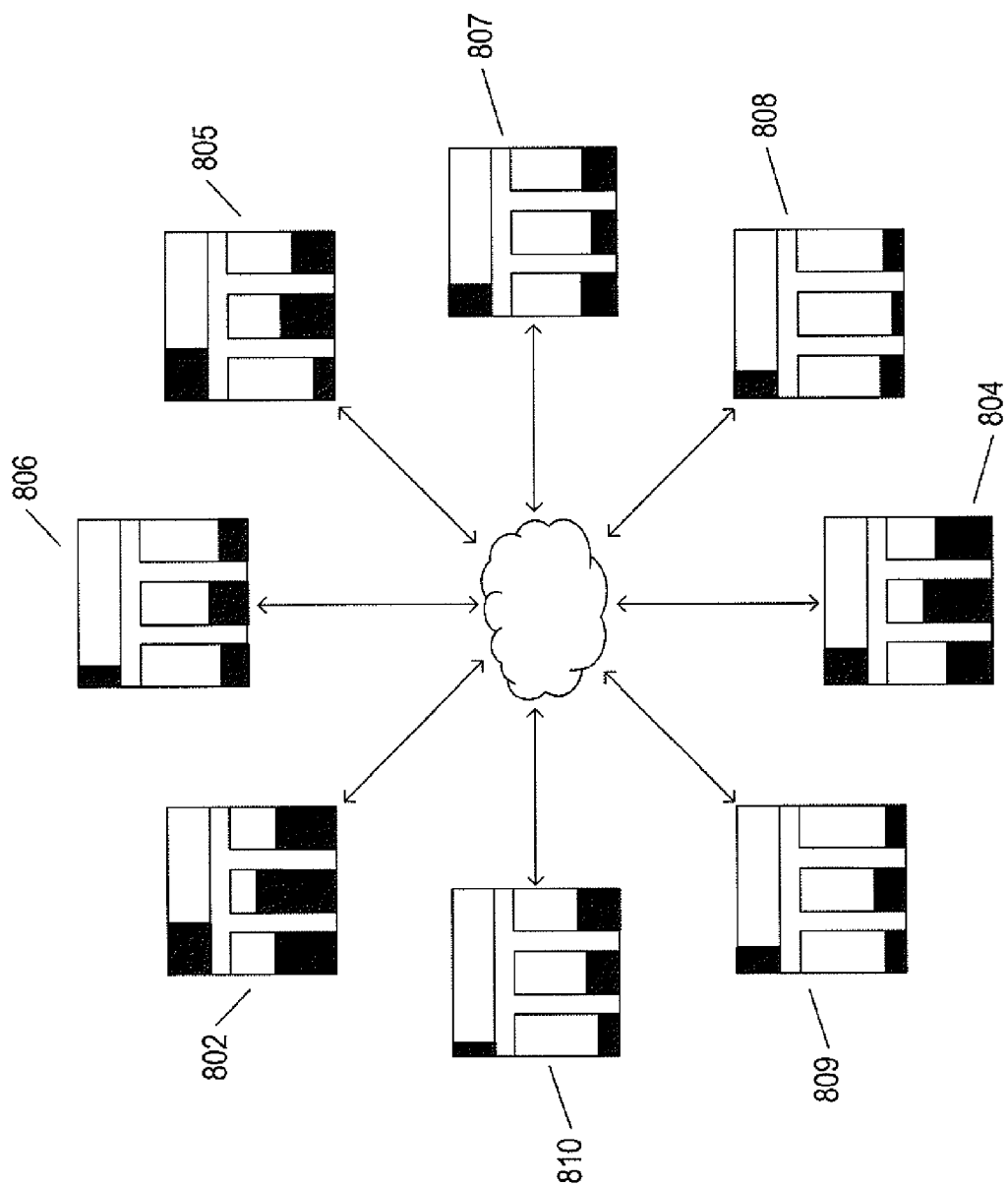
FIGS. 8A-B illustrate a power-conservation operation that represents an example of a distributed-computing-management operation.
Figure 8B:
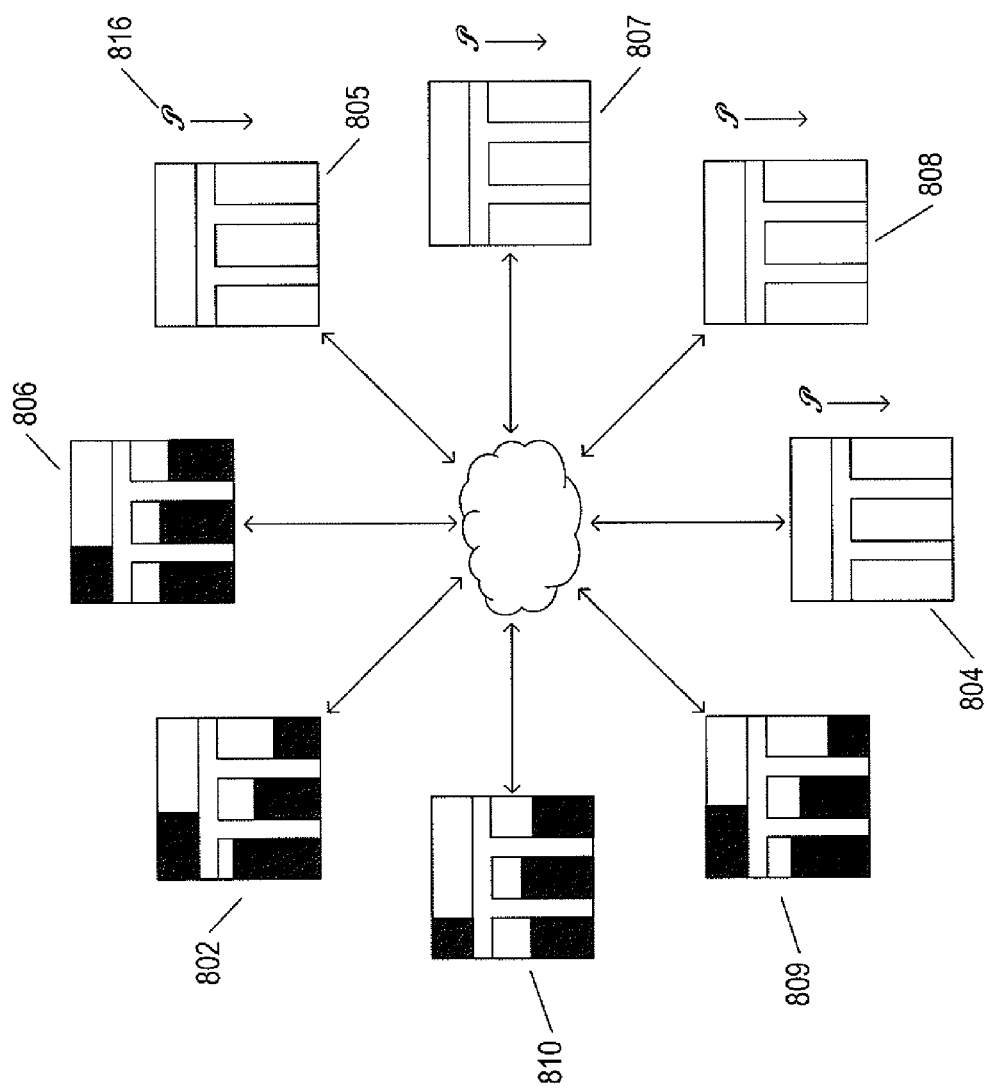

FIGS. 8A-B illustrate a power-conservation operation that represents an example of a distributed-computing-management operation. In FIG. 8A, all of the nodes of the example distributed computer system are currently executing virtual machines, with one node 802 fairly highly loaded, two nodes 804-805 modestly loaded, and five nodes 806-810 lightly loaded. In many cases, the power consumption of a computer system is relatively independent of the computational load on the computer system. Whether lightly loaded or heavily loaded, for example, a computer system must still keep disk platters spinning, RAM-memory powered on, processors powered on, fans spinning, and other components powered on and active. Of course, in modern computer systems, various technologies are employed to selectively power down unneeded components, place underutilized components in low-power states, and to undertake other types of power-consumption management in order to prevent needless consumption of electrical energy. Nonetheless, unless no computational tasks are currently executed within a node, the node generally continuously consumes significant electrical energy. In one type of distributed-computing-system power-management operation, as illustrated in FIG. 8B, computational tasks may be redistributed within a distributed computer system in order to more heavily load some portion of the nodes, such as nodes 806, 802, 810, and 809 in FIG. 8B, so that the remaining nodes, 805, 807, 808, and 804 in FIG. 8B, can be powered down, as indicated by the script P and downward-pointing arrows in FIG. 8B, such as script P and downward-pointing arrow 816.

In summary, a load-balancing operation involves migrating virtual machines and intelligently choosing target nodes on which to launch new virtual machines within a distributed computer system, in order to more or less equally distribute the computational load across all nodes of the distributed computer system, while the power-management operation seeks to redistribute virtual machines and other computational tasks among the nodes of a distributed computer system in order to free up some subset of the nodes and power those nodes down.

A Discussion of the Methods and Systems to which the Current Application is Directed In the case of both load balancing and power management, virtual machines and other executable tasks are distributed and redistributed within a distributed computer system based on the amount of computational resources currently being used in a node or, equivalently, on the amount of computational resources currently available in a node for use. Therefore, in order to carry out distribution and redistribution of computational tasks for load balancing and power management, nodes within the distributed computer system need to determine or estimate the availability of computational resources on other, remote nodes within the distributed computer system or, equivalently, the portion of computational resources in use on the remote nodes. In many currently available distributed-computing-management subsystems and methods, the determination and distribution of resource-availability information is carried out using relatively computationally expensive techniques that involve distributed-locking protocols and significant calculation. As a result, the cost of virtual-machine migration and intelligent launching of new virtual machines may be relatively high, both in compute cycles and in temporal delays. The current application is directed to methods and systems in which resource-availability information is made available within a distributed computer system for nodes of the distributed computer system both quickly and computationally efficiently.

In certain implementations of the currently disclosed methods and systems, nodes broadcast messages at a frequency related to the availability of computational resources within the nodes or, equivalently, related to the portion of computational resources currently being consumed within the node. FIG. 9 illustrates one approach to computing two different message frequencies, $V_{Balance}$ and $V_{Power}$, used, in certain implementations, for load balancing and power management, respectively. FIG. 9 shows an exemplary node 902, using the illustration conventions discussed above with reference to FIGS. 5A-B. The amount of resources currently consumed within this node is characterized 904 by three values S, P, and C. Thus, virtual machines and/or other executing tasks on node 902 is currently consuming 60 percent of the storage capacity of the node, 40 percent of the processing bandwidth of the node, and 50 percent of the communications bandwidth of the node. A resource-availability metric RA, may be computed as:

$$RA = \frac{(1-S) + (1-P) + (1-C)}{3}$$

where $RA \in [0, 1]$, as shown in 906 of FIG. 9. In general, when a node consumes a particular computational resource above a threshold value, the node may be computationally constrained or bound due to overuse of the resource. Therefore, three penalties, $P_S$, $P_P$, and $P_C$, are calculated for each of the storage, processing, and communications resources by:

$$P_S = \begin{cases} -0.5, & \text{when } S > S\_threshold \\ 0, & \text{otherwise} \end{cases}$$

$$P_P = \begin{cases} -0.5, & \text{when } P > P\_threshold \\ 0, & \text{otherwise,} \end{cases}$$

$$P_C = \begin{cases} -0.5, & \text{when } C > C\_threshold \\ 0, & \text{otherwise,} \end{cases}$$

as shown in 908 in FIG. 9. A resource metric, RM, can then be computed as:

$$RM = RA + P_S + P_P + P_C,$$

as shown in Equation 910 in FIG. 9. A final resource-availability metric, $f_{RA}$, can then be computed from the resource metric RM by:

$$f_{RA} = \begin{cases} RM, & \text{when } RM > \min \\ \min & \end{cases}$$

where $f_{RA} \in [\min, 1]$, as shown in 912 in FIG. 9. Finally, the two frequencies $V_{Balance}$ and $V_{Power}$ are computed from the final resource metric as:

$$V_{Balance} = k \cdot f_{RA}$$

$$V_{Power} = \frac{l \cdot \min}{f_{RA}}$$

where $$V_{Balance} \in [k \cdot \min, k]$$

$$V_{Power} \in [l \cdot \min, l],$$

as shown in line 914 in FIG. 9.

The two computed frequencies $V_{Balance}$ and $V_{Power}$ are thus inversely related. $V_{Balance}$ increases as the availability of resources within a node increases and $V_{Power}$ increases with increasing consumption of resources on a node. $V_{Balance}$ and $V_{Power}$ are, in the currently described methods and systems, observables computed by nodes from messages received by the nodes, while k, l, and min are fixed, known quantities. Thus, by observing $V_{Balance}$ and/or $V_{Power}$, a node can determine the final resource metric $f_{RA}$ for a remote node. The value min is used both to keep the computed frequency from falling to 0, for reasons discussed below, as well as to prevent $V_{Power}$ from being an undefined value.

FIGS. 10A-B illustrate use of the computed frequencies $V_{Balance}$ and $V_{Power}$ by a node of a distributed computer system. As shown in FIG. 10A, the node 1002 broadcasts resource messages 1004-1008 periodically to one or more remote nodes. In a given unit time 1010, such as a second, minute, or another larger or smaller unit of time, the node transmits $V_{Balance}$ messages. Equivalently, the interval of time 1012 between messages transmitted by the node 1002 is equal to $$\frac{1}{V_{Balance}}.$$

Similarly, as shown in FIG. 10B, the interval of time 1014 between transmitted messages 1016 and 1018 is $$\frac{1}{V_{Power}}$$

when messages are transmitted according to the $V_{Power}$ frequency. When transmitting messages according to the $V_{Balance}$ frequency, the frequency of messages is directly related to the resource availability of the node and the time interval between messages is inversely related to the resource availability. By contrast, when transmitting messages according to the $V_{Power}$ frequency, the frequency of transmitted messages is inversely proportional to the resource availability and the interval of time between messages is directly proportional to the resource availability. In either case, a receiving node may determine either or both of the frequency of message transmission or interval of time between messages transmitted by a remote node and calculate, knowing k, l, and min, the $f_{RA}$ resource metric value for the node. Thus, a first node can inform a second node of the first node's resource availability by transmitting messages to the second node at a particular frequency. This involves no distributed-locking protocols and no complex calculations, delays, or other computational and temporal overheads, as discussed further, below. Of course, an opposite convention can alternatively be used, with frequencies proportional to a resources-used metric.

FIGS. 11A-C illustrate various types of management that may be carried out within a distributed computer system using methods and systems to which the current application is directed. As shown in FIG. 11A, a single node 1102 may be responsible for load balancing and power management for the entire distributed computer system. In this case, all of the remaining nodes 1104-1110 transmit messages at computed frequencies to the control node 1102, which can then determine the resource availability of nodes 1104-1110 in order to make load-balancing and power-management decisions. Alternatively, as shown in FIG. 11B, two nodes 1102 and 1110 may share management control over the distributed computer system and may transmit resource-availability messages, at computed frequencies, to each other 1112 as well as receiving resource-availability messages, transmitted at computed frequencies, from the remaining nodes 1102-1108. Alternatively, as shown in FIG. 11C, the management functions may be fully distributed within a distributed computer system, in which case all of the nodes 1102, 1104, and 1105-1110 transmit resource-availability messages, at computed frequencies, to each of the remaining nodes. In other words, the currently described methods and systems may be employed regardless of how management operations that use resource-availability information are carried out with respect the nodes of a distributed computer system.

The resource-availability messages may have different forms and contents depending on the particular communication media and communications protocols employed within a distributed computer system. In general, the message may be very simple. FIG. 12 shows an example resource-availability message. The message generally includes a header 1202, the format and contents of which are specified by a communications protocol, but generally including source and destination addresses for the message as well as other protocol information related to the message. The message additionally includes an indication 1204 that the message is a resource-availability message, or "RA message." In certain implementations, this information may be encoded within the header, while in other cases this indication is part of the data payload of the message. Finally, the message may include a node identifier 1206. In certain implementations, the node identifier may not be necessary, since a node receiving the message can infer the identity of the transmitting node from the source address included in the header. However, in many cases, it may be simpler to include the node identifier within the data payload, since each node may employ many different communications-protocol addresses and, moreover, the communications-protocol addresses employed by a node may be dynamic. However an RA message is constructed, it is constructed so that a node receiving the message can identify the sending node and the fact that the message is an RA message.

FIGS. 13A-C illustrate a circular queue that is conveniently used to buffer received messages at many different levels within computer systems. As shown in FIG. 13A, a circular queue is illustrated as a circular buffer containing multiple entries, such as entry 1302 in circular queue 1304. In FIG. 13A, entries filled with data are indicated by cross-hatching and empty entries are indicated by lack of cross-hatching. The circular queue is also associated with an "in" pointer 1306 and an "out" pointer 1308. In the example circular queue 1304, the "in" pointer points to an entry to which a next incoming message should be entered, or queued, and the "out" pointer indicates a filled entry that should be next retrieved from the circular queue. A circular queue is an example of a first-in-first-out queue.

FIG. 13B shows the circular queue 1304 shown in FIG. 13A following input of a next message. The next message has been entered into entry or slot 1310 and the "in" pointer has been advanced, in a clockwise direction, to point to a next free entry 1302. FIG. 13C shows extraction of a message from the circular queue 1304 shown in FIG. 13A. The message in entry 1314 in FIG. 13A has been removed from the circular queue and the "out" pointer has been advanced by one entry in the clockwise direction to point to the message-containing entry 1316. The circular queues used in methods and systems of the current application are continuously written, without necessarily removing entries, by overwriting older entries during input operations, when the entry pointed to by the in pointer contains data, and by advancing both the in and out pointers when the queue is filled. Thus, a circular queue containing eight entries stores the eight most recently received messages in a continuous stream of messages when each incoming message is input into the circular queue. These circular queues support various methods, including the method in( ) which inputs a message into the circular queue, advancing the "in" pointer when the circular queue is not filled and advancing both the "in" and "out" pointers when the circular queue is filled, and a method out( ) which extracts the least most recently received message from the circular queue, in general without advancing the "out" pointer, and additional methods discussed below. Circular queues are generally implemented using linear address spaces in memory, with the circularization obtained from the logic of the circular-queue methods. Circular queues are used, in the current discussion, as an example of the many different suitable data-buffering techniques that can be used to buffer data extracted from received RA messages.

Figure 14:
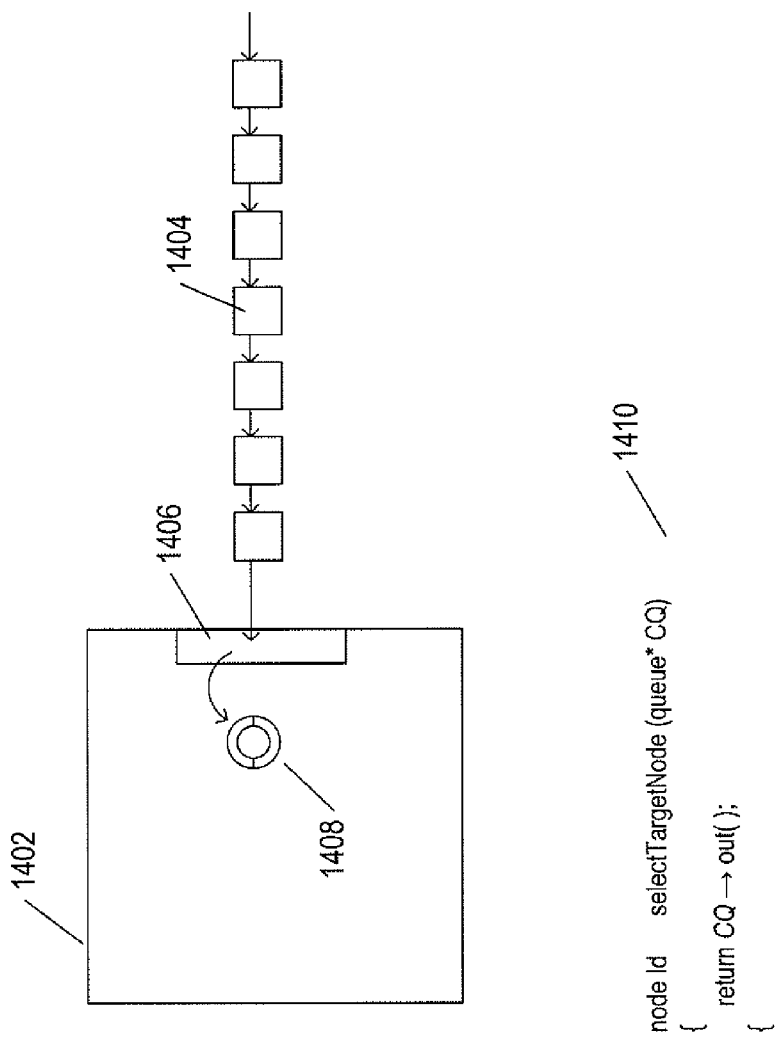
FIG. 14 illustrates one implementation of the methods and systems to which the current application is directed.

FIG. 14 illustrates one implementation of the methods and systems to which the current application is directed. In FIG. 14, a node 1402 of a distributed computer system receives a stream of resource-availability messages, such as resource-availability message 1404, from other nodes of the distributed computer system. All of the messages are received by a communications subsystem 1406 and node identifiers extracted from the received resource-availability messages are continuously queued to a two-entry circular queue 1408, as described above with reference to FIGS. 13A-C, that can be continuously written to, when full, by advancing both the in and out pointers. A circular queue is used, in this case, to avoid complexities involved with asynchronous readers and writers. Once RA messages are being received, a reader can read a valid entry from the circular queue regardless of whether or not the communications subsystem is writing a next entry into the circular queue. It is presumed that at least two RA messages will be received before a target node needs to be selected. Without that assumption, the circular queue in each RA-message-receiving node can be initialized with default node-identifier entries. In this case, the "out" function member of the circular queue does not need to remove an entry from the circular queue, but simply returns a node identifier stored in the queue entry.

As RA messages are received from the other nodes of the distributed computer system by a first node, those of the other nodes with greatest resource availability, when using the $V_{Balance}$ computed frequencies, transmit resource-availability messages most frequently. Therefore, at any point in time, a node identifier extracted from the two-entry circular queue in the first node has highest probability of corresponding to a node with a large resource availability. Thus, simply extracting an entry from the circular queue furnishes a target node for both configuring and launching a new virtual machine or other executable task or to which a virtual machine or other task can be moved from another node for load-balancing purposes. Similarly, when RA messages are transmitted according to the $V_{Power}$ frequency, then extracting a node identifier from the circular queue by a first node results in obtaining a node identifier, with high probability, corresponding to another node with comparatively low resource availability. In power-management operations, a management operation attempts to redistribute virtual machines and launch new virtual machines, or other computational tasks, on already loaded machines in order to completely unload some subgroup of the nodes of a distributed-computer system so that those nodes can be powered down.

FIG. 14 also includes pseudocode for a "selectTargetNode" routine 1410. In this routine, a reference to the two-entry queue is provided by the argument CQ. A node identifier is extracted from the two-entry queue and returned as the target node. As discussed above, the selected node from the two-entry circular queue has a high probability of being an appropriate target node for load balancing, when the RA messages are transmitted according to $V_{Balance}$ frequency, or for power management, when the RA messages are transmitted according to the $V_{Power}$ frequency.

Rather than using the distributed-locking-protocol-based methods and complex computations currently used for distributing resource-availability information among nodes of a distributed computer system, the currently described methods and systems involve only the transmission of resource-availability messages at calculated frequencies, a simple two-entry circular queue into which node identifiers extracted from the messages are entered, with overwriting, and simple extraction of node identifiers from the circular queue when a target node is needed for distributed-computing-system-management operations. The maximum frequency at which resource-availability messages are transmitted can be scaled, using the k and l coefficients discussed above with reference to FIG. 9, so that the communications-traffic overheads are insignificant within the context of normal distributed-computing-system operations. In addition to low computational overhead and simplicity, the currently disclosed methods and systems do not incur communications-related time delays in furnishing target node identifiers, because the target node identifier is already available in the circular queue, and does not need to be requested from remote nodes.

As mentioned above, in reference to FIG. 9, the constant min both prevents an undefined value for $V_{Power}$ as well as ensures that, regardless of how low or how great the resource availability becomes within a node, the node still transmits resource-availability messages at some low frequency. This introduces a level of stochastic uncertainty into the method, similar to uncertainty used in various optimization and search routines to prevent the optimization and search routines from becoming stuck or stabilized at local minima or maxima. Even in the case that improper resource availabilities are inferred by a first nodes with respect to a second node, due perhaps to resonant oscillations in the resource availability within the node that match the frequency of message transmission, the stochastic uncertainty provided by occasional RA-message transmissions ensures that every node will eventually selected as target node within a finite period of time. Occasional unjustified selection of a node as a target node does not lead to crashes or unrecoverable errors, but only to slight inefficiencies involved in unnecessarily redistributing virtual machines or other computational tasks routed to misidentified target nodes.

In certain cases, load balancing and power management represent opposing trends in the overall management of a distributed computer system. As one example, it may be that the peak computational load on a distributed computer system occurs between 9:00 am in the morning and 4:00 pm in the afternoon, during which all nodes of the distributed computer system need to be operational and the overall computational load fairly balanced among them. However, at other times, the overall load may be considerably lower, in which case a significant number of the nodes are best powered down in order to conserve consumption of electrical energy. The above-described implementation can accommodate these types of operational-mode fluctuations by using stored or distributed information to direct nodes to transmit RA messages according to the $V_{Balance}$ frequency between 9:00 am and 4:00 pm and otherwise use the $V_{Power}$ frequency calculation as the basis for RA-message transmission.

Figure 15:
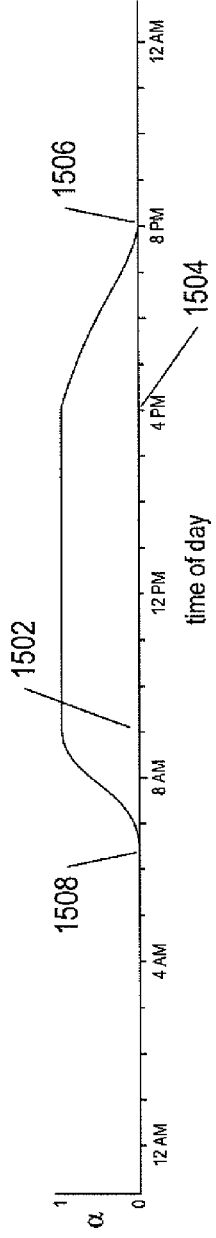
FIG. 15 shows a plot, or model, for a variable α that can be used to facilitate a smooth transition of the distributed computer system management from a power-management mode of operation to a load-balancing mode of operation.

Another approach to using the currently described methods and systems in the above-described two-mode operational scheme is to employ an RA-message-transmission frequency V computed as a linear combination of $V_{Balance}$ and $V_{Power}$. In other words: V=α VBalance+(1−α) $V_{Power}$. FIG. 15 shows a plot, or model, for a variable α that can be used to facilitate a smooth transition of the distributed computer system management from a power-management mode of operation to a load-balancing mode of operation. The variable α has a value of "1" between 9:00 AM 1502 and 4:00 PM 1504 and a value of "0" between 8:00 PM 1506 and 6:30 AM 1508.

Figure 16:
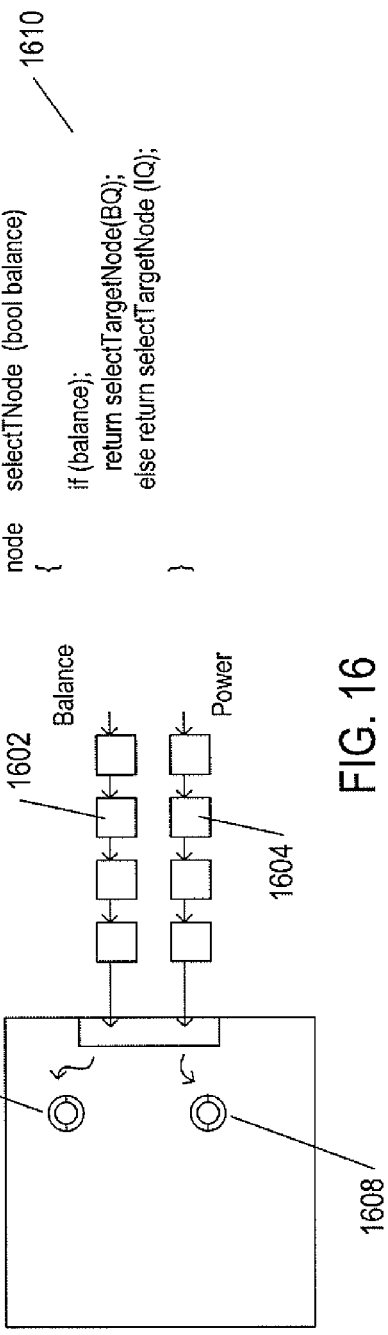
FIG. 16 illustrates an alternative implementation in which a node receives two different types of RA messages.

Alternatively, two different types of RA messages may be used. FIG. 16 illustrates an alternative implementation in which a node receives two different types of RA messages. A stream of balance RA messages, such as balance RA message 1602 and a stream of power RA messages, such as power RA message 1604, are transmitted by each node according to the $V_{Balance}$ and $V_{Power}$ frequencies, respectively. Node identifiers from the balance RA messages are written into a first two-entry queue 1606 and node identifiers from the power RA messages are written into a second two-entry queue 1608. The routine "selectTNode" 1610 takes, as an argument, a Boolean value indicating whether or not a target for load balancing or a target for power management is sought and returns a node identifier from the appropriate one of the two circular queues 1606 and 1608. Thus, in this second implementation, each distributed-computing-system node transmit balance RA message at the computed $V_{Balance}$ frequency and power RA messages at the computed $V_{Power}$ frequency allowing receiving nodes to select targets for either load balancing or power management at any point in time.

Figure 17:
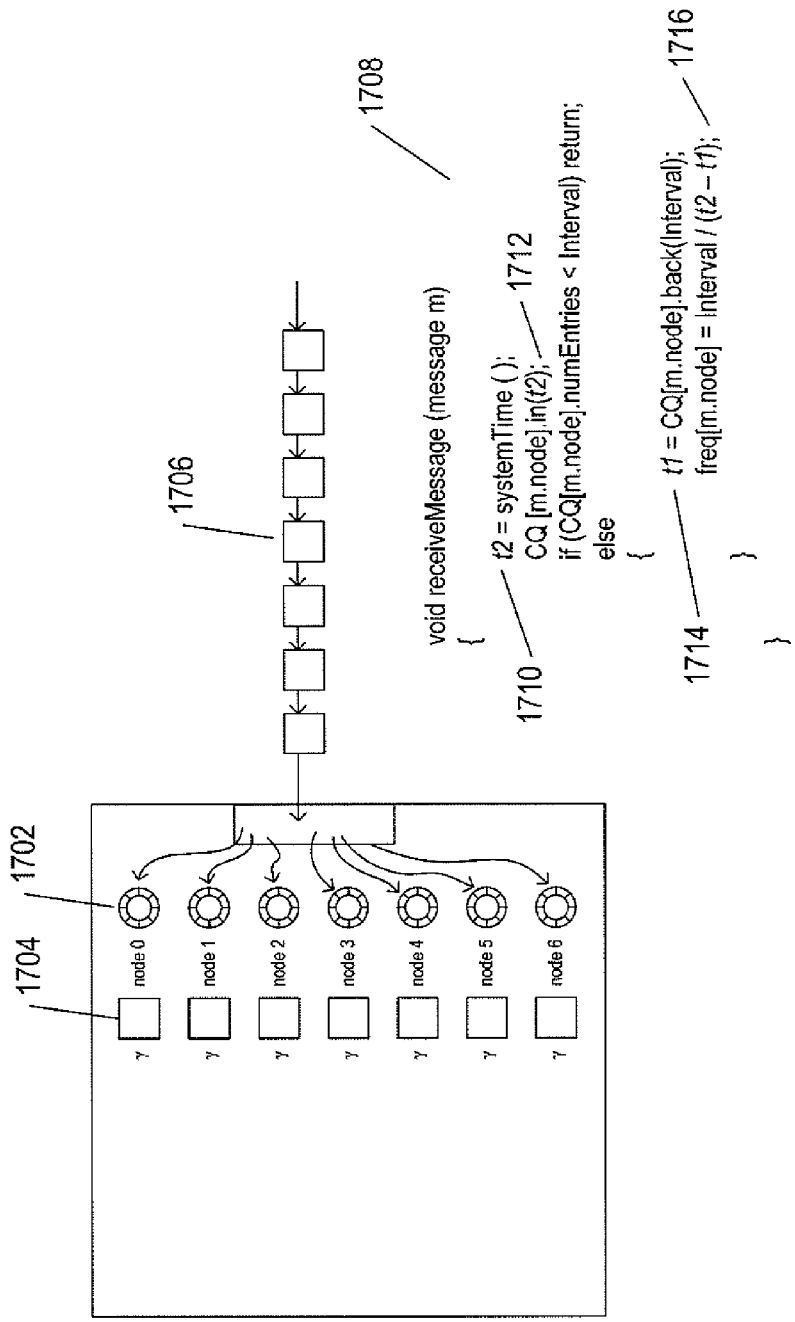
FIG. 17 shows a third resource-availability-information distribution implementation.

As an exercise in completeness, a next implementation uses RA-message transmission to provide resource-availability metrics, on demand, within a first node with respect to the remaining nodes of a distributed computer system. This is not necessarily a practical implementation, but shows that full resource-availability information can be distributed among the nodes of a distributed computer system using transmission of RA messages at computed frequencies. FIG. 17 shows a third resource-availability-information distribution implementation. In this implementation, each node that uses resource-availability information to make decisions that involve selecting target nodes based on resource availability maintains a separate circular queue and frequency value for each remote node of the distributed computer system, such as circular queue 1702 and associated frequency value 1704. The external nodes transmit RA messages based on a computed frequency, which are received as a stream of RA messages 1706 by those nodes needing to maintain resource-availability information to remote nodes. FIG. 17 provides pseudocode 1708 for a received message routine that processes each received RA message. When the message is received, a system time is obtained via a system call and stored in a local variable t2 1710. This time is written to the circular queue corresponding to the node which transmitted the message 1712. Then, when there are sufficient entries in the circular queue, which is always the case after an initial start-up period, the routine obtains a second time t1 1714 from a less recent queue entry and computes the frequency at which messages are being received from the remote node 1716. In this fashion, the node can maintain an updated current estimate of the message-transmission frequency from each remote node which can be used, as discussed above with reference to FIG. 9, to compute the resource availability of each node.

FIGS. 18-23 provide control-flow diagrams as alternative illustrations of the methods and systems for resource-availability-information distribution to which the current application is directed. These control-flow diagrams are intended to provide an illustration of several implementations of the currently disclosed methods and systems. Many alternative implementations are possible.

Figure 18:
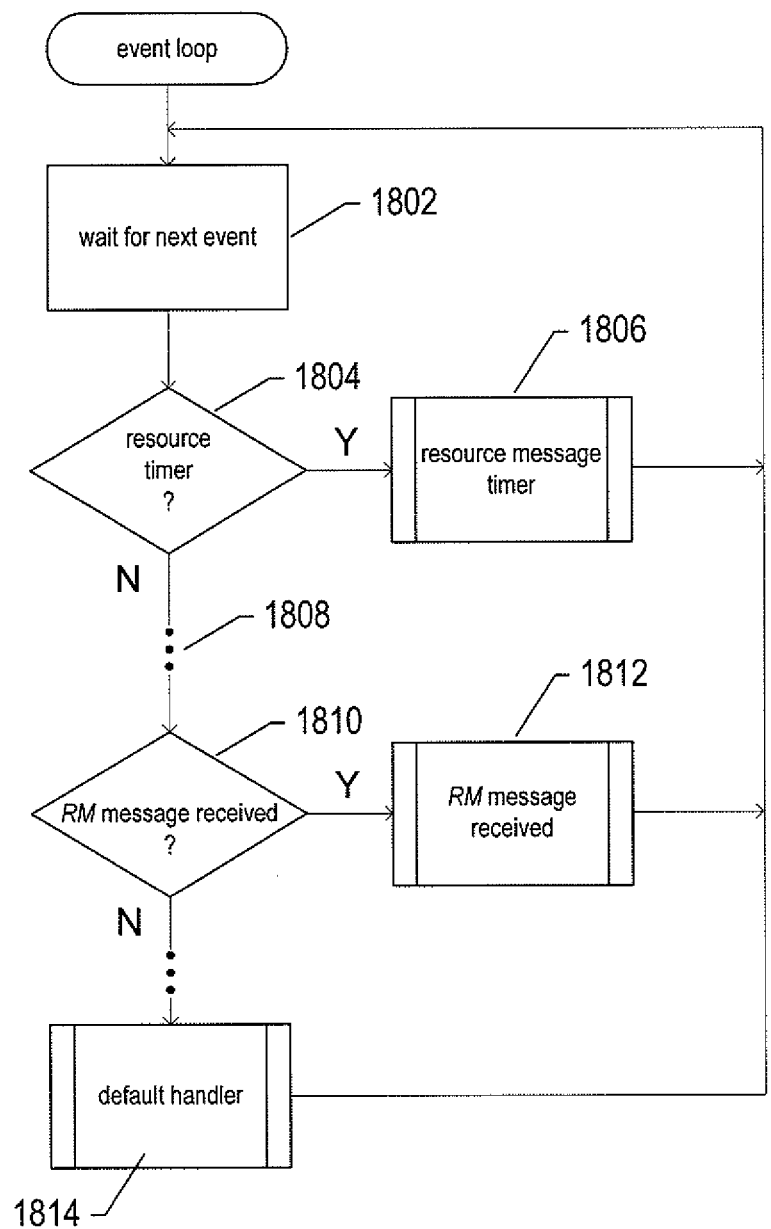
FIGS. 18-23 provide control-flow diagrams as alternative illustrations of the methods and systems for resource-availability-information distribution to which the current application is directed.

FIG. 18 provides a control-flow diagram for a routine "eventLoop," which represents an underlying event loop within a distributed-computing-system node. In step 1802, the node waits for a next event to occur. In the case that the next-occurring event is a resource-timer expiration event, as determined in step 1804, the routine "resourceMessageTimer" is called in step 1806 to handle the event. Many other possible events may be identified and handled in the event loop, as represented by ellipses 1808. In the case the event is a resource-message-received event, as determined in step 1810, the routine "resourceMessageReceived" is called in step 1812. A catch-all default handler 1814 may handle unexpected events. In general, some type of event loop executes at some level within a distributed-computing-system node and includes detection of resource-timer-expiration events and RM-message-reception events in order to facilitate resource-availability-information distribution according to the currently disclosed methods and systems.

Figure 19:
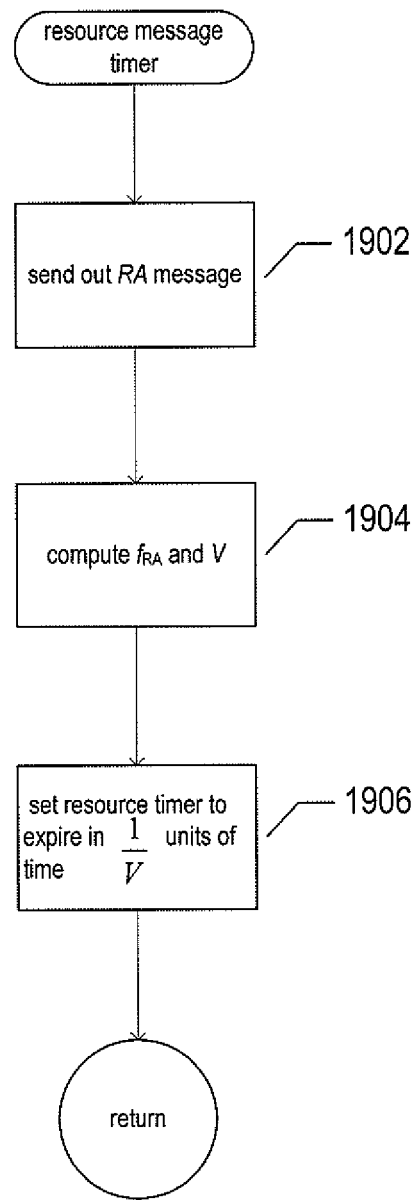

FIG. 19 provides a control-flow diagram for the routine "resourceMessageTimer" called in step 1806 of FIG. 18. In step 1902, the routine "resourceMessageTimer" transmits an RA message to receiver nodes of RA messages in the distributed computer system. As discussed above, this may be carried out using a single broadcast-mode RA-message transmission or by transmitting individual RA messages to receiving nodes. In a symmetrical, peer-to-peer system, the RA message are generally sent from each node to all other nodes in the distributed computer system. Next, in step 1904, the routine computes a current $f_{RA}$ metric and corresponding message-transmission frequency V. In certain implementations, both $V_{Balance}$ and $V_{Power}$ are computed in this step. In other implementations, a single frequency V is computed as a linear combination of $V_{Balance}$ and $V_{Power}$. In many implementations, only a single frequency representative of the resource availability or current resource consumption of the node is computed. In step 1906, the resource timer is set to expire in 1/V units of time.

Figure 20:
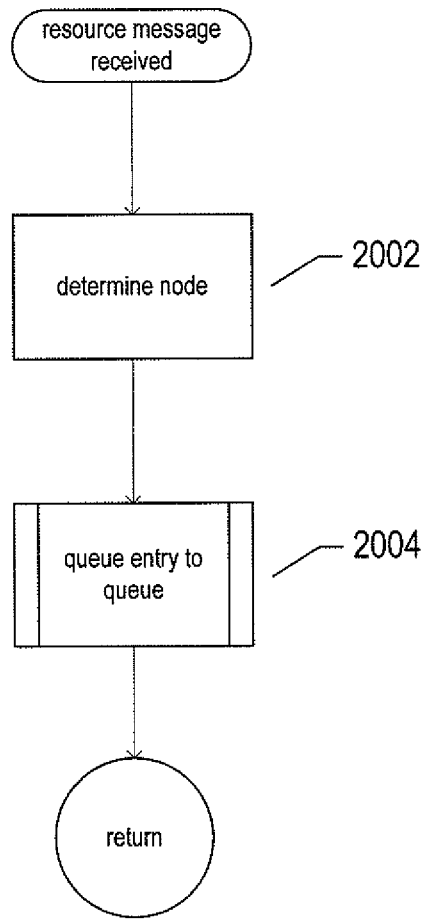

FIG. 20 provides one implementation of the routine "resourceMessageReceived" called in step 1812 of FIG. 18. In step 2002, the routine extracts a node identifier from a received RA message in order to determine the node from which the RA message was received. Then, in step 2004, the routine queues an entry to a circular queue. In certain implementations, a node identifier is queued to a single circular queue to which all RA messages are written. In other implementations, discussed above with reference to FIGS. 16 and 17, the node identifier obtained in step 2002 is or an RA-message type is used to select one of multiple circular queues to which to input an entry in step 2004. In certain implementations, the entry comprises the node identifier. In other cases, the entry is the time at which the message was received.

Figure 21:
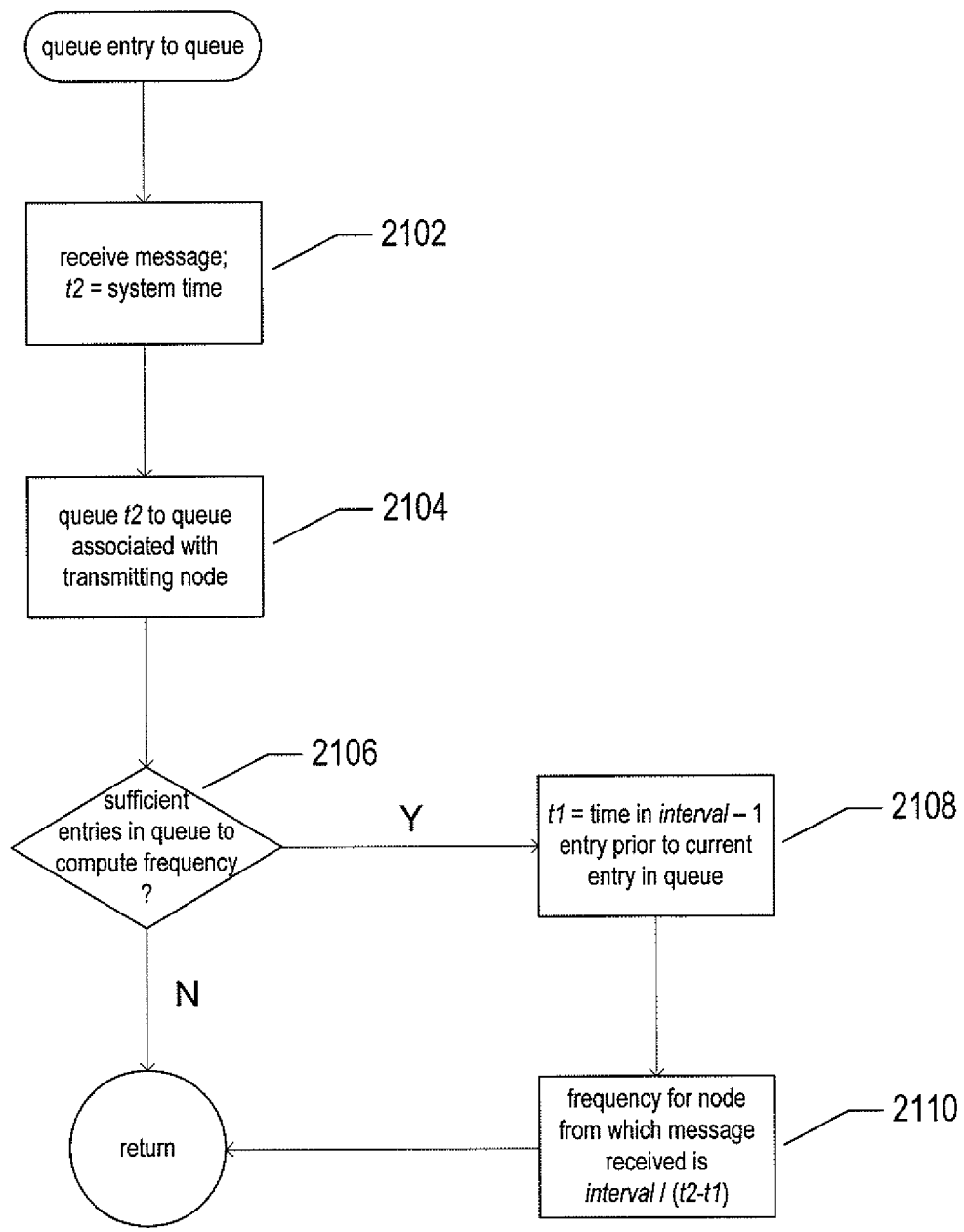

FIG. 21 provides a control-flow diagram for the routine "queueEntryToQueue," called in step 2004 FIG. 20, for the implementation discussed above with reference to FIG. 17. In step 2102, the message is received and a current system time t2 is obtained by a call to a system routine. In step 2104, the current system time t2 is queued to the circular queue corresponding to the node from which the message was received. When there are sufficient entries in the queue to compute a frequency for the node, as determined in step 2106, a second time t1 is extracted from the queue from a previous entry in step 2108 and the frequency for the node is computed in step 2110. The value interval is the number of messages that forms an interval for computing the frequency. The last received and first received times corresponding to this interval are used to compute the frequency, as discussed above with reference to FIG. 17.

Figure 22:
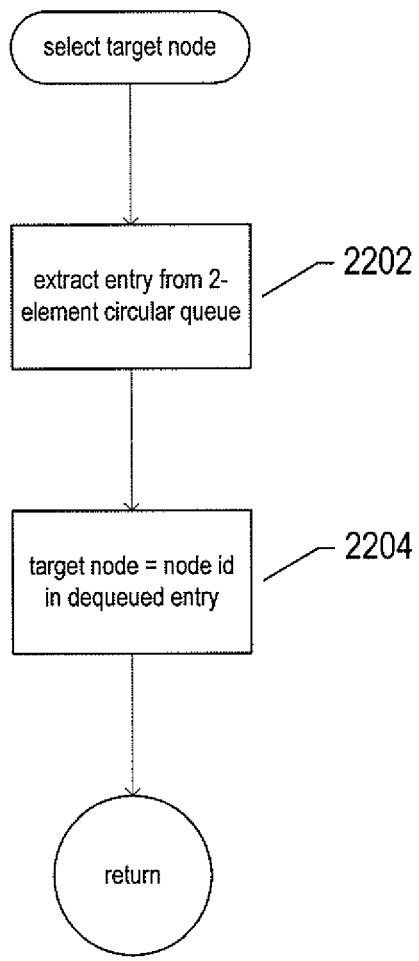
Figure 23:
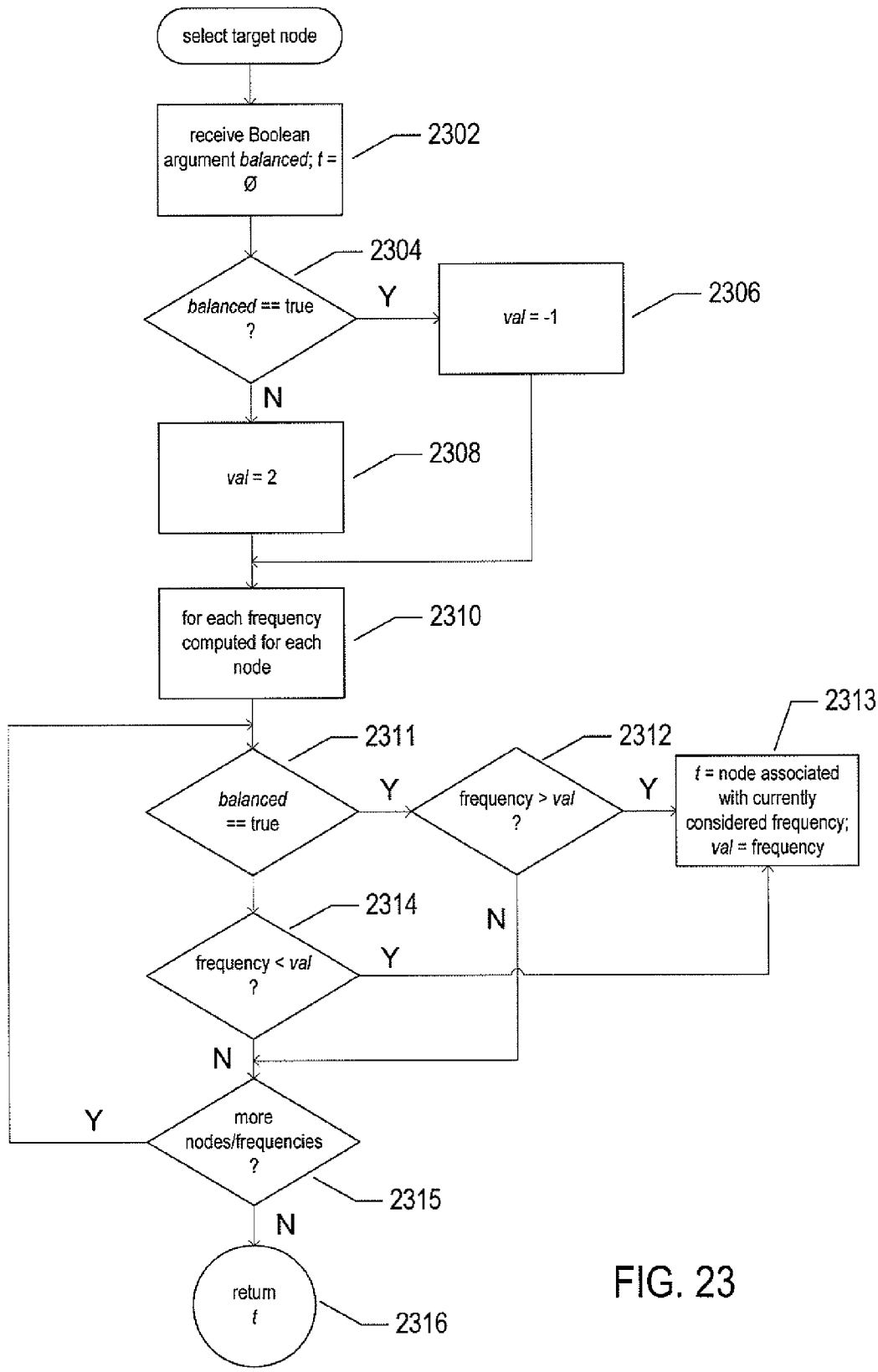

FIG. 22 provides a control-flow diagram for a routine "selectTargetNode." In this implementation, a target node for either load-balancing purposes or power-management purposes is obtained by extracting an entry from a two-element circular queue, in step 2202, and returning the node identifier in that entry as the target node, in step 2204. FIG. 23 provides an alternative implementation of the routine "selectTargetNode" for the implementation described with reference to FIG. 17. In step 2302, the Boolean argument balanced is received in local variable t is set to Ø. When balanced is true, then local variable val is set to −1, in step 2306 and otherwise set to 2 in step 2308. Then, in the for-loop of steps 2310-2315, all the frequencies maintained for each of the remote nodes in the distributed computer system are searched to find the highest frequency, when the received argument balanced is true, or the lowest-frequency, when the received Boolean argument balanced is false, node to return as the target node in step 2316.

Figure 24A:
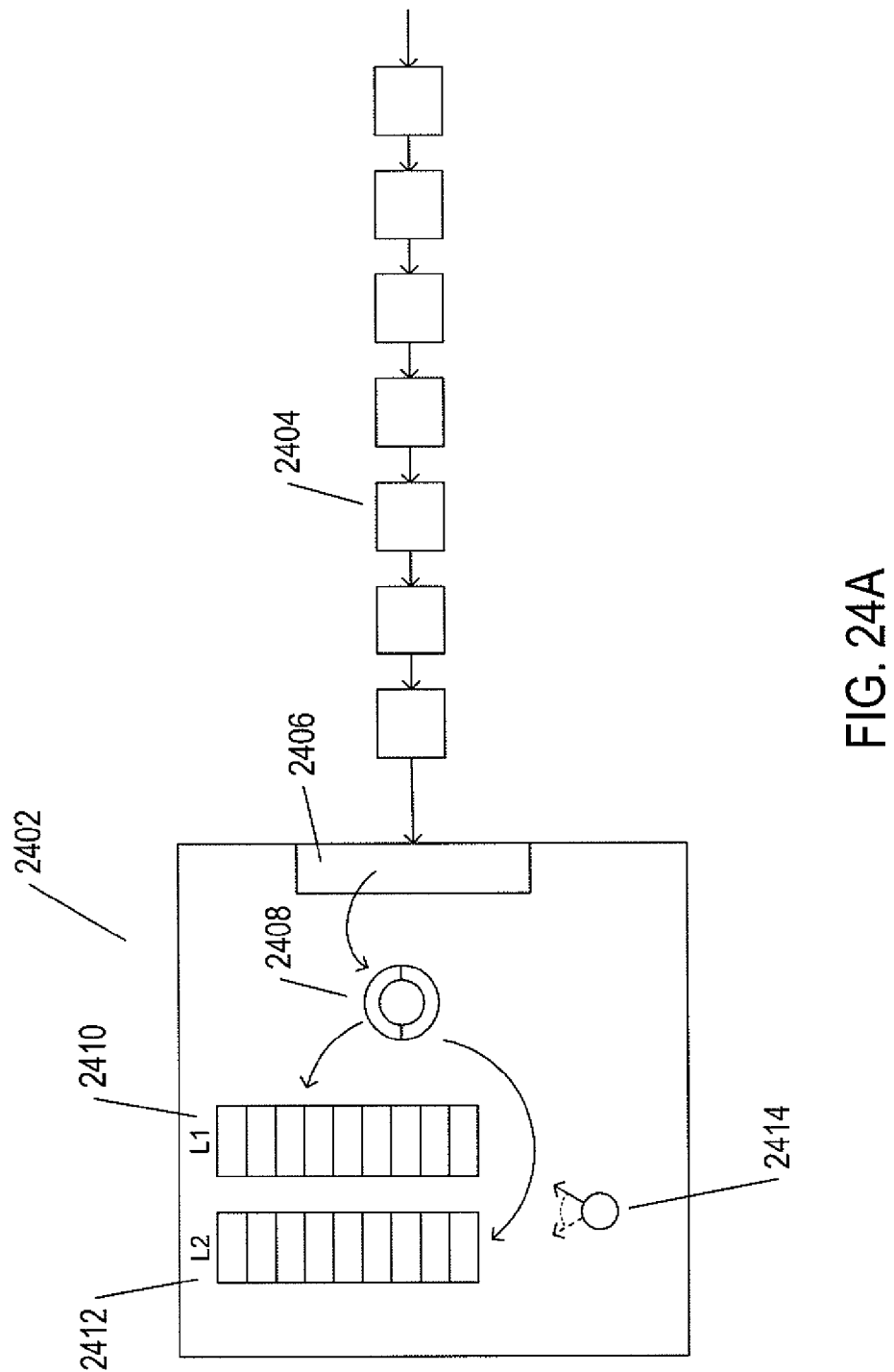
FIGS. 24A-D illustrate an additional feature that can be added to any of the above-discussed implementations.

FIGS. 24A-D illustrate an additional feature that can be added to any of the above-discussed implementations. This additional feature is discussed, below, in the context of the implementation discussed above with reference to FIG. 14. FIG. 24A illustrates the additional feature using illustration conventions similar to those used in FIG. 14. As in FIG. 14, a node 2402 of a distributed computer system receives a stream of resource-availability messages 2404 processed by a communications subsystem 2406, with node identifiers extracted from the received resource-availability messages and continuously queued to a two-entry circular queue 2408. However, this implementation additionally includes two lists 2410 and 2412 and a current-list indicator 2414. At regular intervals, target-node identifiers are extracted from the two-entry circular queue 2408 and used to update entries in each of the two lists 2410 and 2412 corresponding to the target node. In essence, the lists store counts for each possible target node. Over time, the counts reflect the relative frequencies of the resource messages sent by the different possible target nodes.

Initially, the current-list indicator 2414 is set to indicate one of the two lists L1 2410 and L2 2412. At regular intervals, the current list, indicated by the current-list indicator, is cleared and the current-list indicator is switched to point to the other of the two lists. In this fashion, the counts stored in entries of the two lists represent counts accumulated over a recent time interval, rather than being accumulated continuously from power-on or other such events. In this fashion, as the resource capacities of various remote nodes change, those changes are reflected within the relative counts stored in the lists. In other words, the counts reflect the resource capacities of remote nodes as determined over the most recent list-switch interval.

At each update of a list entry, or at some regular interval, the lists may be sorted. When the node wishes to select a target node for some operation, such as a target node for migration of a virtual machine or for launching a new virtual machine, the node uses the counts in the current sorted list pointed to be the current-list indicator to select a target node having a suitable relative resource capacity with respect to the other nodes. For example, it may be the case that a large virtual machine needs to be migrated, in which case the node may select a target node with the greatest number of counts as being the target node with greatest available capacity to handle the large virtual machine. In other cases, a target node within average or median resource capacity may be selected for another type of virtual machine or for other reasons.

Figure 24B:
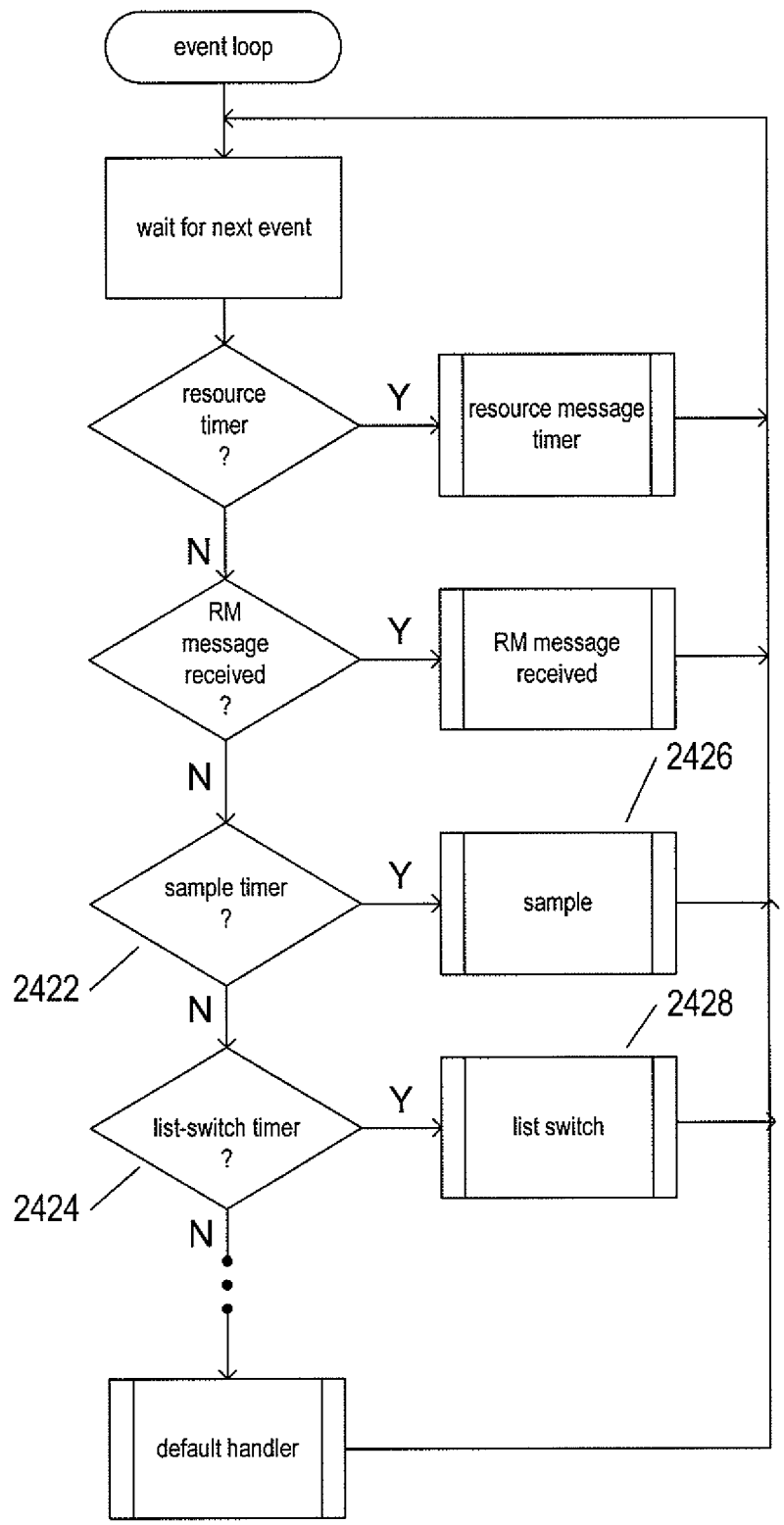
Figure 24C:
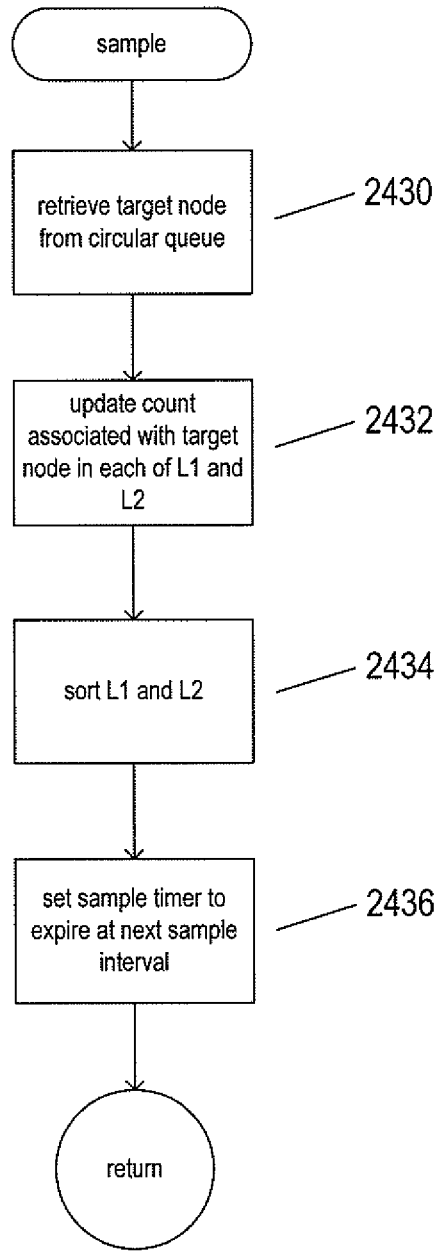
Figure 24D:
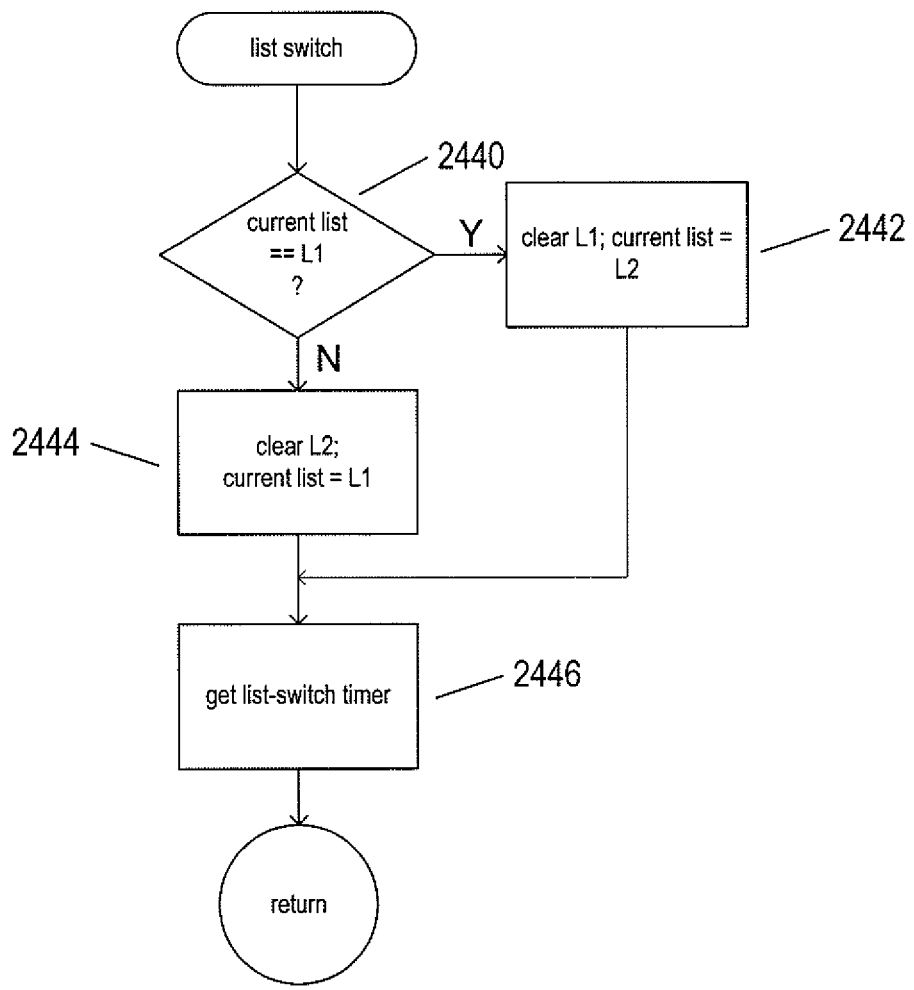

FIGS. 24B-D illustrate, using illustration conventions previously employed in FIGS. 18-20, changes to the implementation discussed with reference to FIG. 14 that accommodate the additional target-node-ordering feature discussed above with reference to FIG. 24A. FIG. 2413 shows an event loop similar to that shown in FIG. 18. However, two more types of events have been added to the event loop, including detection of a sample-timer expiration, in step 2422, and a list-switch-timer expiration, in step 2424. The sample timer controls the frequency for sampling the two-entry circular queue (2408 in FIG. 24A) and the list-switch timer controls the interval for switching the current-list indicator (2414 in FIG. 24A).

FIG. 24C shows a control-flow diagram for the sample routine called from the event loop in step 2426 of FIG. 24B. In step 2430, the routine "sample" retrieves a target node from the two-entry circular queue and, in step 2432, updates a count associated with a target node in each of the lists L1 and L2 (2410 and 2412 in FIG. 24A, respectively). Then, in step 2434, the routine "sample" sorts the two lists. As discussed above, this sorting may occur after each update, as in FIG. 24C, or may alternatively occur only after a set number of updates or after expiration of a sorting timer. Finally, in step 2436, the routine "sample" sets the sample timer to expire at a next sample-interval time point.

FIG. 24D provides a control-flow diagram for the "list switch" routine called in step 2428 of FIG. 24B. When the current list, as indicated by the current-list indicator (2414 in FIG. 24A) is list L1, as determined in step 2440, then list L1 is cleared and the current-list indicator is switched to point to list L2, in step 2442. Otherwise, list L2 is cleared and the current-list indicator is set to point to list L1, in step 2444. In step 2446, the routine "list switch" sets the list-switch timer to expire at a next list-switch interval.

Figure 25A:
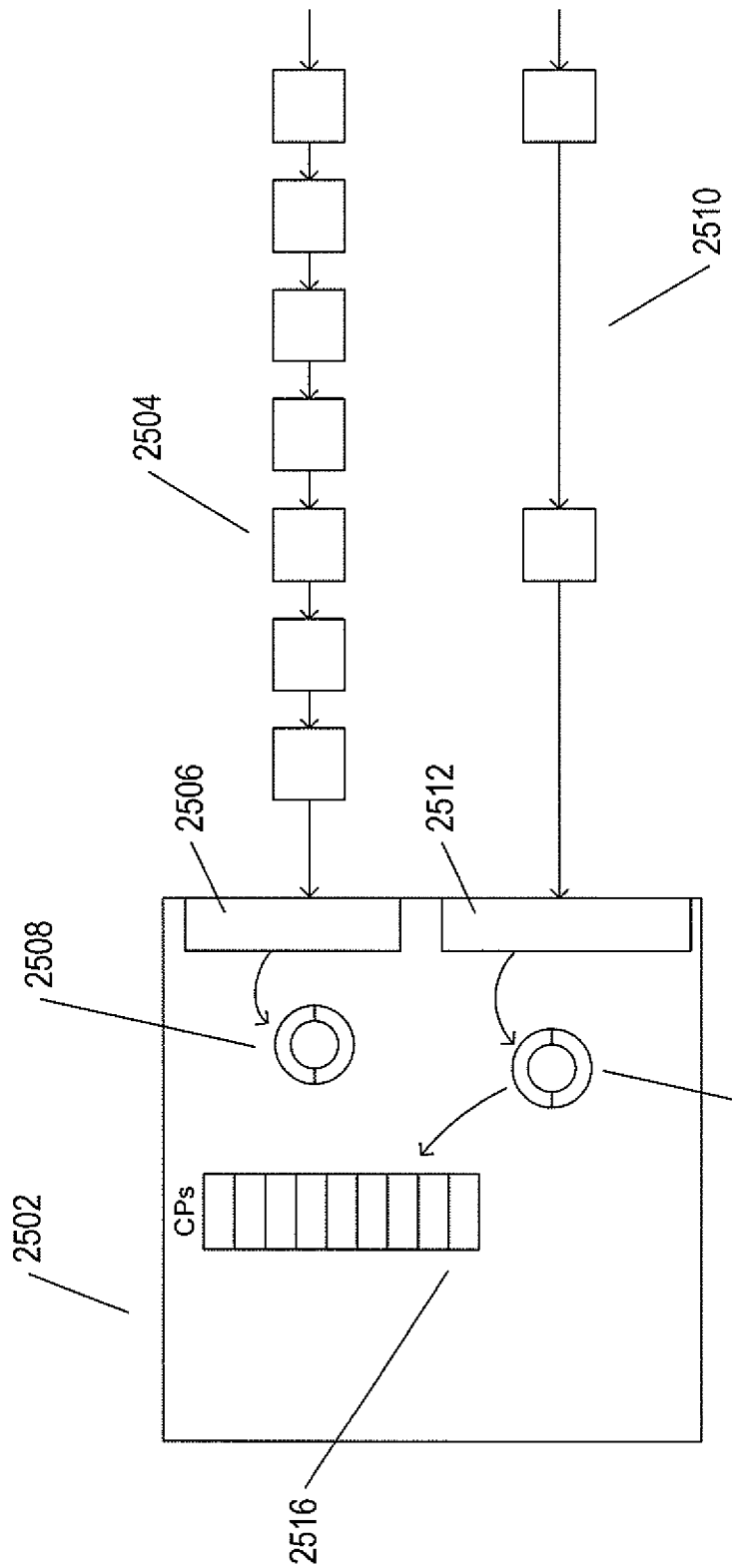
FIGS. 25A-B illustrate yet an additional feature that may be incorporated into any of the implementations so far discussed.
Figure 25B:
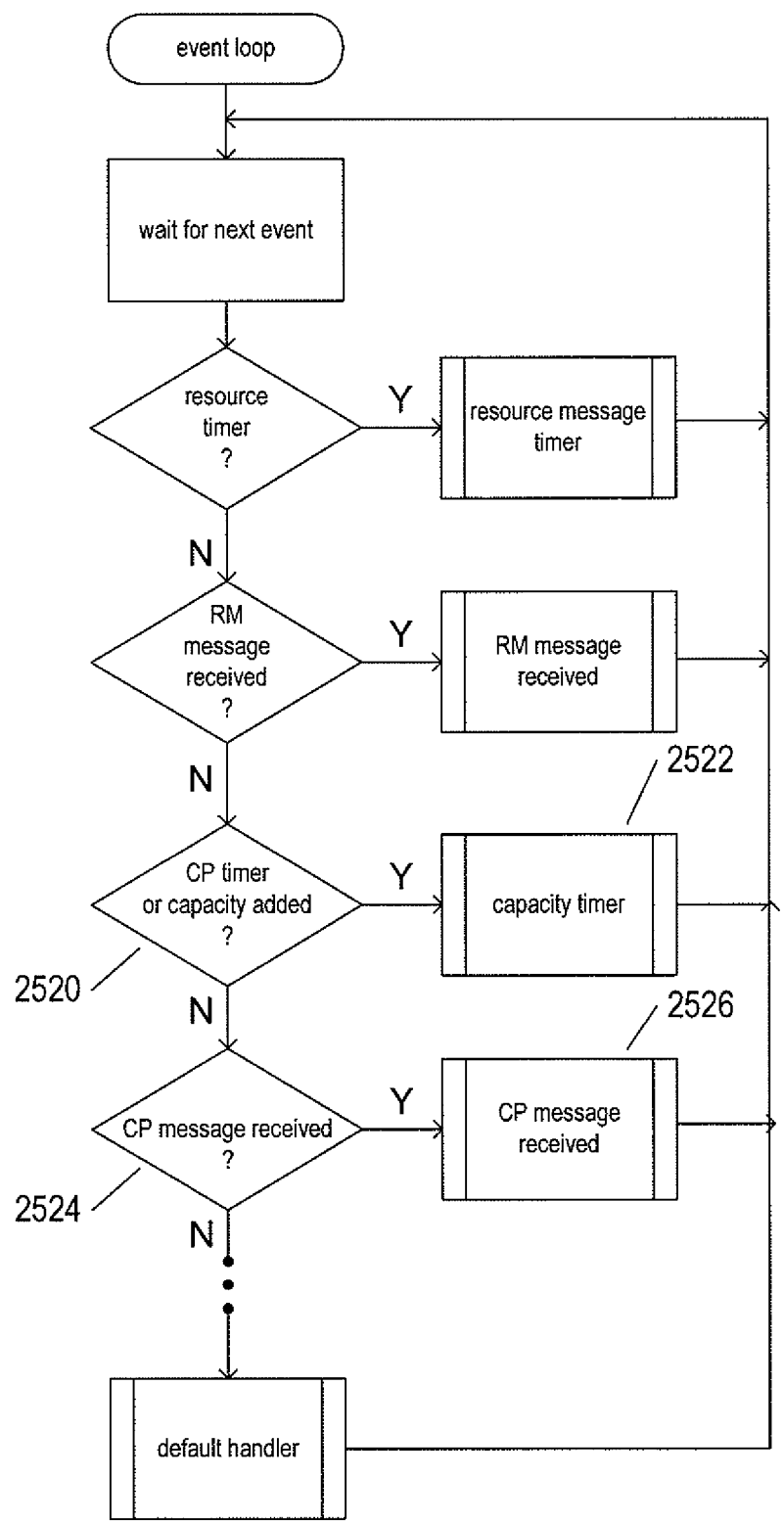

FIGS. 25A-B illustrate yet an additional feature that may be incorporated into any of the implementations so far discussed. As discussed above, the resource metric is computed as a fraction of the total resources available within a particular node. Thus, the resource metric value falls in the range [0,1]. However, the total resource capacities of nodes may vary. In many cases, when selecting a target node, the selecting entity seeks to understand the total resource capacity of a node in order to interpret the fractional capacity based on the resource metric determined from the frequency of resource messages received from the node. To that end, an additional feature may be added to each of the above-discussed implementations to furnish the total-resource-capacity information to the nodes within a distributed computer system.

FIG. 25A illustrates the additional feature using the illustration conventions used previously in FIG. 14. As in FIG. 14, a node 2502 receives a stream of resource-availability messages 2504 which are processed by a communications subsystem 2506 in order to extract target-node identifiers and place them in a two-entry circular queue 2508. In addition, in order to implement the additional feature, the node also receives capacity messages, or CP messages 2510, which are processed, by the same or a different communications subsystem 2512, to place capacity indications in a two-entry circular queue 2514 from which the capacity information is processed to update entries in a capacity list 2516. The capacity list 2516 includes an entry for each node from which resource-availability messages and capacity messages are received. The entries in the capacity list include numerical values reflective of the total resource capacity of the remote nodes. During target-node selection for any of various purposes, a node can use the capacity information contained in the capacity list to normalize the resource-metric information that may be obtained by one or more of the above-discussed methods in order to determine the total available capacity of a remote node. For example, if, by one of the above-discussed techniques, the node pictured in FIG. 25A can infer that the resource metric for a target node is 0.6, then the node can multiply this resource metric by a total-capacity value stored in the capacity list for the target node to determine an absolute resource capacity for that node. However, better methods involve using CP messages to normalize broadcast frequencies, as discussed below, so that the transmission frequencies of RM messages are reflective of the actual capacities of the transmitting nodes rather than reflective only of the fraction of the transmitting node's capacity that is available. In this way, targets decide whether or not they can accommodate a new or relocated computational task. This is more reliable than for a node selecting a target to attempt to decide whether or not the target can accommodate the new or relocated computational task FIG. 25B illustrates additions to the event loop of FIG. 18 to accommodate the absolute-capacity feature discussed above with reference to FIG. 25A. A capacity-timer expiration or a change in resource capacity is detected in step 2520, which invokes a routine "capacity timer" 2522 to send out a capacity message and reset the capacity timer. A CP-message-received event 2524 corresponds to reception of a capacity message by the node, resulting in calling of the routine "CP message received" 2526 to process the message and update the capacity list. In an alternative implementation, a capacity message may be sent by a node only when the total resource capacity of the node changes. In still alternative embodiments, resource capacity messages may include capacity values for each of various different resources, rather than an overall capacity value.

The added feature discussed with reference to FIGS. 25A-B represents a decentralized scheme that provides target-node selectors with an ability to obtain an estimate of the actual capacity of remote nodes. In an alternative implementation, resource-capacity information broadcast by the nodes in the distributed computing environment may instead be used, by each node, to normalize the resource metric that they compute as a first step in determining a resource-message broadcast frequency. As discussed above, a resource-availability metric RA, may be computed as:

$$RA = \frac{(1-S)+(1-P)+(1-C)}{3}$$

where $$RA \in [0, 1],$$

where S, P, and C represent the amount of storage, processor, and communications resources currently consumed within this node. This metric is essentially a fraction of the total resource capacity of a node that is currently unused. As also discussed above, a different resource metric RM, can be computed as:

$$RM=RA+P_S+P_P+P_C,$$

where $P_S$, $P_P$, and $P_C$ are penalties for resource capacity approaching 0. Again, the resource metric RM is a modified fraction of the total resource capacity of a node that is currently unused. However, as discussed above, different nodes within a distributed-computing environment may have different resource capacities. As a result, particularly for the first-described frequency-based target-node selection method discussed above with reference to FIG. 14, a small-capacity node with a relatively large-valued local RA or RM metric may end up broadcasting resource messages at a higher frequency than a large-capacity node with a lower-valued RA or RM metric, even though the large-capacity node may have substantially more absolute resource availability than the smaller node. In a worst case, the smaller-capacity node may actually have insufficient processor bandwidth, communications bandwidth, and/or data-storage capacity to accommodate launching of a new VM or executing an already running VM, while the large-capacity node with the lower-valued RA or RM metric may actually have sufficient resource capacity, as a result of which a target-node selection may end up choosing an inadequate target node when an adequate target node is available.

In an alternative implementation, CP messages are used, by each node, to obtain a local representation of the total resource capacity available within the distributed-computing environment. The CP messages may be broadcast by each node, in a decentralized fashion, as discussed above, or may instead be broadcast by a distributed-computing-environment management node or subsystem. In either case, the local representation of the total resource capacity available within the distributed-computing environment need not be extremely accurate or up-to-date in order to prevent the suboptimal target-node selection discussed above. Even when total-resource-capacity information for a remote node is unavailable, the total-resource-capacity information for the remaining remote nodes of a distributed-computing environment may often be adequate to provide a sufficient normalization of the RA and RM metrics to prevent the above-discussed suboptimal target selection.

The local representation may be a list of total-resource capacities for the nodes of the distributed computing environment (2516 in FIG. 25A). Using this information, the above-discussed RA or RM metric locally computed within a node can be globally normalized by:

$$RA = RA \cdot \frac{totalCapacity_{localNode}}{\sum_{i \in \{nodes\}} totalCapacity_i}$$

$$RM = RM \cdot \frac{totalCapacity_{localNode}}{\sum_{i \in \{nodes\}} totalCapacity_i},$$

where the sum is over all of the nodes of the distributed-computing environment. The frequency of transmission of resource messages is then based on the normalized RA or RM metric, rather than the local RA or RM. In this case, the broadcast frequencies reflect the resource availabilities of remote nodes with respect to the total resource capacity of the distributed-computing environment, rather than the fraction of local resources available. Alternatively, the CP messages received by a node may include a fractional value c representing the nodes fractional amount of resources with respect to the distributed computing environment, as determined by a management node or subsystem, so that the node can normalize the locally computed RA or RM by:

$$RA=cRA$$

$$RM=cRM$$

The normalization is approximate, in both cases. The normalized resource metrics computed at any given point in time by all of the nodes in a distributed-computing environment do not necessarily add to 1.0. However, the normalization is adequate for avoiding the suboptimal target selection based on locally computed resource-availability metrics.

Although the present invention has been described in terms of particular embodiments, it is not intended that the invention be limited to these embodiments. Modifications within the spirit of the invention will be apparent to those skilled in the art. For example, any of many different implementations of the currently disclosed methods and systems can be obtained by varying any of many different design and implementation parameters, including hardware platform, operation system, programming language, control structures, data structures, modular organization, and other such design and implementation parameters. Many different approaches may be used to compute resource-availability metrics and to compute frequency of message transmission based on the computed resource-availability metric. A wide variety of different approaches may be used for selecting target nodes based on a stream of received RA messages, including the three different implementations discussed above with reference to FIGS. 15-17.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A distributed-computing system comprising:
two or more nodes, each node including one or more processors, one or more electronic memories, and one or more data-storage devices;
a communications medium through which a first node transmits messages to a second node; and
computer instructions, stored in one of the one or more memories and executed by one of the one or more processors within the first node that control the first node to
determine a value for a resource-availability metric,
compute a frequency from the resource-availability metric, and
transmit, to the second node, messages at the computed frequency.

2. The distributed-computing system of claim 1 wherein the resource-availability is one of:
a value that represents the portions of one or more computational resources within the first node available for use;
a value that represents the portions of one or more computational resources currently used within the first node; and
a value that represents the available computational resources within the first node.

3. The distributed-computing system of claim 1 wherein the frequency computed from the resource-availability metric is proportional to the resource-availability metric.

4. The distributed-computing system of claim 1 wherein the messages transmitted to the second node contain information that allows the second node, upon receiving the messages, to determine which node transmitted the messages.

5. The distributed-computing system of claim 1 further including an integral number of nodes n greater than 2.

6. The distributed-computing system of claim 5 wherein a single receiving node receives messages sent by the remaining n−1 nodes, each of the remaining n−1 nodes computing a frequency at which the node transmits messages to the receiving node based on a resource-availability metric.

7. The distributed-computing system of claim 5 wherein a group of m receiving nodes receive messages sent by the remaining n−m nodes, each of the remaining n−m nodes computing a frequency at which the node transmits messages to the receiving node based on a resource-availability metric.

8. The distributed-computing system of claim 5 wherein each of the n nodes receives messages sent by the remaining n−1 nodes and each of the of the n nodes transmits messages to the n−1 node at a frequency computed from a resource-availability metric computed for the node.

9. The distributed-computing system of claim 1 wherein the first node additionally sends capacity messages to the second node at regular intervals, indicating the first node's resource capacity.

10. A distributed-computing system comprising:
two or more nodes, each node including one or more processors, one or more electronic memories, and one or more data-storage devices;
a communications medium through which a first node transmits messages to a second node; and
computer instructions, stored in one of the one or more memories and executed by one of the one or more processors within the second node that control the second node to
receive messages from the first node, and write a node identifier associated with each received message to a memory buffer, and
select a target node on which to launch a new virtual machine or executable task or to which to move a currently executing virtual machine or executable task by retrieving a node identifier from the memory buffer.

11. The distributed-computing system of claim 10 wherein the memory buffer is one of:
a circular queue with two or more entries;
a buffer with associated asynchronous reader and writer access methods.

12. The distributed-computing system of claim 10 further comprising:
computer instructions, stored in one of the one or more memories and executed by one of the one or more processors within the first node that control the first node to
determine a value for a resource-availability metric,
compute a frequency from the resource-availability metric, and
transmit, to the second node, messages at the computed frequency.

13. Computer instructions, stored in a physical computer-instruction storage device or physical storage medium, such as an optical or magnetic disk or an electronic memory, that, when executed on one or more processors within a distributed-computing system comprising an integral number n greater than 2 of nodes, each node including one or more processors, one or more electronic memories, one or more data-storage devices, and a communications medium through which a one or more transmitting nodes of the n nodes transmit message to one or more receiving nodes of the n nodes:
control each of the one or more transmitting nodes to
determine a value for a resource-availability metric,
compute a frequency from the resource-availability metric, and
transmit messages at the computed frequency to the one or more receiving nodes; and control each of the one or more receiving nodes to
- receive messages from the one or more transmitting nodes and write a node identifier associated with each received message to a memory buffer, and
- select a target node on which to launch a new virtual machine or executable task or to which to move a currently executing virtual machine or executable task by retrieving a node identifier from the memory buffer.

14. The computer instructions, stored in a physical computer-instruction storage device or physical storage medium, of claim 13 wherein the resource-availability is one of:
- a value that represents the portions of one or more computational resources within a transmitting node available for use;
- a value that represents the portions of one or more computational resources currently used within a transmitting node; and
- a value that represents the available computational resources within the first node.

15. The computer instructions, stored in a physical computer-instruction storage device or physical storage medium, of claim 13 wherein the computational resources include one or more of:
- data-storage capacity;
- processor bandwidth;
- communications bandwidth.

16. The computer instructions, stored in a physical computer-instruction storage device or physical storage medium, of claim 13 wherein the computer instructions control computation of the frequency from the resource-availability metric by multiplying the resource-availability metric by a constant scale factor.

17. The computer instructions, stored in a physical computer-instruction storage device or physical storage medium, of claim 13 wherein the computer instructions control computation of the frequency from the resource-availability metric by multiplying the inverse of the resource-availability metric by a constant scale factor.

18. The computer instructions, stored in a physical computer-instruction storage device or physical storage medium, of claim 13 wherein the transmitted messages contain information that allows a receiving node, upon receiving a message, to determine which transmitting node transmitted the message.

19. The computer instructions, stored in a physical computer-instruction storage device or physical storage medium, of claim 13 wherein the memory buffer is one of:
- a circular queue with two or more entries;
- a buffer with associated asynchronous reader and writer access methods.

20. The computer instructions, stored in a physical computer-instruction storage device or physical storage medium, of claim 13 wherein the one or more transmitting nodes represent a subgroup of the n nodes and the one or more receiving nodes represent a subgroup of the n nodes.

21. The computer instructions, stored in a physical computer-instruction storage device or physical storage medium, of claim 13 wherein each of the n nodes is both a transmitting node and a receiving node.

* * * * *